US012299876B2

(12) United States Patent
Xu et al.

(10) Patent No.: US 12,299,876 B2
(45) Date of Patent: May 13, 2025

(54) DEEP LEARNING BASED BLOB DETECTION SYSTEMS AND METHODS

(71) Applicants: Yanzhe Xu, Tempe, AZ (US); Teresa Wu, Gilbert, AZ (US); Fei Gao, Sunnyvale, CA (US)

(72) Inventors: Yanzhe Xu, Tempe, AZ (US); Teresa Wu, Gilbert, AZ (US); Fei Gao, Sunnyvale, CA (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 459 days.

(21) Appl. No.: 17/698,750

(22) Filed: Mar. 18, 2022

(65) Prior Publication Data

US 2022/0318999 A1    Oct. 6, 2022

Related U.S. Application Data

(60) Provisional application No. 63/164,699, filed on Mar. 23, 2021.

(51) Int. Cl.
*G06T 7/00* (2017.01)
*G06T 15/08* (2011.01)
*G06V 10/44* (2022.01)
*G06V 10/77* (2022.01)

(52) U.S. Cl.
CPC ............ *G06T 7/0012* (2013.01); *G06T 15/08* (2013.01); *G06V 10/454* (2022.01); *G06V 10/7715* (2022.01); *G06T 2207/30084* (2013.01)

(58) Field of Classification Search
CPC ......... G06T 7/00; G06T 7/0012; G06T 15/08; G06T 2207/30084; G06V 10/454; G06V 10/7715; G06V 10/44; G06V 10/77
See application file for complete search history.

(56) References Cited

U.S. PATENT DOCUMENTS

| | | |
|---|---|---|
| 2004/0151356 A1 | 8/2004 | Li et al. |
| 2005/0119829 A1 | 6/2005 | Bishop et al. |
| 2005/0244042 A1 | 11/2005 | Sirohey et al. |
| 2007/0036409 A1 | 2/2007 | Valadez et al. |
| 2007/0133894 A1 | 6/2007 | Kiraly et al. |
| 2008/0100612 A1 | 5/2008 | Dastmalchi et al. |

(Continued)

OTHER PUBLICATIONS

R. Abramson et al., "Methods and Challenges in Quantitative Imaging Biomarker Development", Academic Radiology, vol. 22, No. 1, pp. 25-32, 2015.

(Continued)

*Primary Examiner* — Tuan H Nguyen
(74) *Attorney, Agent, or Firm* — Snell & Wilmer L.L.P.

(57) ABSTRACT

A system for blob detection using deep learning is disclosed. The system may include a non-transitory computer-readable storage medium configured to store a plurality of instructions thereon which, when executed by a processor, cause the system to train a U-Net and generate a probability map including a plurality of centroids of a plurality of corresponding blobs, derive two distance maps with bounded probabilities, apply Difference of Gaussian (DoG) with an adaptive scale constrained by the two distance maps with the bounded probabilities, and apply Hessian analysis and perform a blob segmentation.

19 Claims, 10 Drawing Sheets

(56) References Cited

U.S. PATENT DOCUMENTS

| | | | |
|---|---|---|---|
| 2009/0005693 | A1 | 1/2009 | Brauner et al. |
| 2009/0122060 | A1 | 5/2009 | Porat et al. |
| 2011/0044524 | A1 | 2/2011 | Wang et al. |
| 2011/0293157 | A1 | 12/2011 | Ye et al. |
| 2012/0155734 | A1 | 6/2012 | Barratt et al. |
| 2012/0294502 | A1 | 11/2012 | Chan et al. |
| 2013/0022548 | A1 | 1/2013 | Bennett |
| 2013/0230230 | A1* | 9/2013 | Ajemba .............. G06T 7/155 382/133 |
| 2013/0329972 | A1 | 12/2013 | Zhang et al. |
| 2014/0270436 | A1 | 9/2014 | Dascal et al. |
| 2016/0189373 | A1 | 6/2016 | Park et al. |
| 2019/0139216 | A1* | 5/2019 | Georgescu ............. G06N 3/048 |

OTHER PUBLICATIONS

Y. Al-Kofahi, et al., "Improved automatic detection and segmentation of cell nuclei in histopathology images," IEEE Trans. Biomed. Eng., vol. 57, No. 4, pp. 841-852, Apr. 2010.

L. Annet et al., "Glomerular Filtration Rate: Assessment with Dynamic Contrast-Enhanced MRI and a Cortical-Compartment Model in the Rabbit Kidney", Journal of Magnetic Resonance Imaging, vol. 20, No. 5, pp. 843-849, 2004.

N. Badshah, et al., "Multigrid Method for the Chan-Vese Model in Variational Segmentation," Communications in Computational Physics, vol. 4, No. 2, pp. 294-316, 2008.

E. J. Baldelomar et al., "Phenotyping by magnetic resonance imaging nondestructively measures glomerular number and volume distribution in mice with and without nephron reduction," Kidney Int., vol. 89, No. 2, pp. 498-505, 2016.

E. J. Baldelomar, et al., "Measuring rat kidney glomerular number and size in vivo with MRI," Am. J. Physiol. Renal Physiol., vol. 314, No. 3, pp. F399-F406, 2018.

E. J. Baldelomar, et al., "In vivo measurements of kidney glomerular number and size in healthy and Os/+ mice using MRI," Am. J. Physiol.—Ren. Physiol., vol. 317, No. 4, pp. F865-F873, 2019.

J. Batson et al., "Noise2Seif: Blind denoising by self-supervision," in 36th International Conference on Machine Learning, ICML, pp. 524-533, 2019.

S. C. Beeman et al., "Measuring glomerular number and size in perfused kidneys using MRI," AJP Ren. Physiol., vol. 300, No. 6, pp. F1454-F1457, 2011.

S. C. Beeman et al., "Toxicity, Biodistribution, and Ex Vivo MRI Detection of Intravenously Injected Cationized Ferritin," Magnetic Resonance in Medicine, vol. 69, 584 No. 3, pp. 853-861, 2013.

S. C. Beeman et al., "MRI-based glomerular morphology and pathology in whole human kidneys," AJP Ren. Physiol., vol. 306, No. 11, pp. F1381-F1390, 2014.

K. M. Bennett et al., "MRI of the basement membrane using charged nanoparticles as contrast agents," Magn. Reson. Med., vol. 60, No. 3, pp. 564-574, 2008.

K. Bennett et al., "MRI Quantification of Single Glomerular Function", Meeting Abstract, American Journal of Kidney Diseases, vol. 53, No. 4, 25, p. A29, 2009.

K.M. Bennett et al., "The Emerging Role of MRI in Quantitative Renal Glomerular Morphology" American Journal of Physiology Renal Physiology, vol. 304, No. 10, pp. F1252-F1257, 2013.

J. P. Bergeest et al., "Efficient Globally Optimal Segmentation of Cells in Fluorescence Microscopy Images Using Level Sets and Convex Energy Functionals," Medical Image Analysis, Elsevier Ltd., vol. 16, No. 7, pp. 1436-1444, 2012.

E. Bernardis et al., "Segmentation Subject to Stitching Constraints: Finding Many Small Structures in a Large Image," in Proceedings of the International Conference on Medical Image Computing and Computer Assisted Intervention, pp. 119-126, Sep. 2010.

E. Bernardis et al., "Finding Dots: Segmentation as Popping Out Regions from Boundaries", in Proceedings of the IEEE Conference on Computer Vision and Pattern Recognition (CVPR), pp. 199-206, 2010.

E. Bernardis et al., "Pop Out Many Small Structures from a Very Large Microscopic Image," Medical Image Analysis, vol. 15, No. 5, pp. 690-707, 2011.

J. F. Bertram, "Analyzing Renal Glomeruli with the New Stereology", International Review of Cytology, W. J. Kwang and J. Jonathan, eds., pp. 111-172: Academic Press, 1995.

G. Bertrand, "On Topological Watersheds," Journal of Mathematical Imaging and Vision, vol. 22, No. 2-3, pp. 217-230, 2005.

J.-P. Bonvalet, et al., "Compensatory Renal Hypertrophy in Young Rats: Increase in the Number of Nephrons," Kidney International, vol. 1, No. 6, pp. 391-396, 1972.

T. F. Chan, et al., "Active Contours Without Edges," IEEE Transactions on Image Processing, vol. 10, No. 2, pp. 266-277, Feb. 2001.

J. R. Charlton, et al., "Magnetic resonance imaging accurately tracks kidney pathology and heterogeneity in the transition from acute kidney injury to chronic kidney disease," Kidney Int., 2020, doi: 10.1016/j.kint.2020.08.021.

H. T. Chiang, et al., "Noise Reduction in ECG Signals Using Fully Convolutional Denoising Autoencoders," IEEE Access, vol. 7, pp. 60806-60813, 2019.

T. C. Chiang, et al., "Tumor detection in automated breast ultrasound using 3-D CNN and prioritized candidate aggregation," IEEE Trans. Med. Imaging, vol. 38, No. 1, pp. 240-249, Jan. 2019.

D. C. Ciresan, et al., "Mitosis detection in breast cancer histology images with deep neural networks," Int. Conf. Med. Image Comput. Comput. Interv. Springer, Berlin, Heidelb., pp. 411-418, 2013.

A. Corduneanu, et al., "Variational Bayesian model selection for mixture distributions." Artificial intelligence and Statistics. vol. 2001. Waltham, MA: Morgan Kaufmann, 2001.

C. Couprie, et al., "Power Watersheds: A New Image Segmentation Framework Extending Graph Cuts, Random Walker and Optimal Spanning Forest", in Proceedings of the IEEE 12th International Conference on Computer Vision (ICCV), pp. 731-738, 2009.

J. Cousty, et al., "Watershed Cuts: Minimum Spanning Forests and the Drop of Water Principle," IEEE Transactions on Pattern Analysis and Machine Intelligence, vol. 31, No. 8, pp. 1362-1374, Aug. 2009.

L. A. Cullen-McEwen, et al., "Estimating Total Nephron Number in the Adult Kidney Using the Physical Disector/Fractionator Combination", Methods in Molecular Biology, vol. 886, pp. 333-350, 2012.

D. Danon, et al., "Use of Cationized Ferritin as a Label of Negative Charges on Cell Surfaces," Journal of Ultrastructure Research, vol. 38, No. 5, pp. 500-510, 1972.

Q. Dou, et al., "Multilevel Contextual 3-D CNNs for False Positive Reduction in Pulmonary Nodule Detection," IEEE Trans. Biomed. Eng., vol. 64, No. 7, pp. 1558-1567, Jun. 2017.

O. Dzyubachyk, et al., "Advanced Level-Set-Based Cell Tracking in Time-Lapse Fluorescence Microscopy," IEEE Transactions on Medical Imaging, vol. 29, No. 3, pp. 852-867, Mar. 2010.

E. Eikefjord, et al., "Use of 3D DCE-MRI for the Estimation of Renal Perfusion and Glomerular Filtration Rate: An Intrasubject Comparison of Flash and KWIC With a Comprehensive Framework for Evaluation", American Journal of Roentgenology, vol. 204, No. 3, pp. W273-W281, Mar. 2015.

P. Esser, et al., "A Variational U-Net for Conditional Appearance and Shape Generation," in Proceedings of the IEEE Computer Society Conference on Computer Vision and Pattern Recognition, pp. 8857-8866, 2018.

A. Esteva, et al., "Dermatologist-level classification of skin cancer with deep neural networks.," Nature, vol. 542, No. 7639, pp. 115-118, 2017.

T. Falk, et al., "U-Net: deep learning for cell counting, detection, and morphometry," Nat. Methods, vol. 16, No. 1, pp. 67-70, 2019.

A.F. Frangi, et al. "Multiscale vessel enhancement filtering." International Conference on Medical Image Computing and Computer-Assisted Intervention. Springer Berlin Heidelberg, 1998.

F. Gao, et al., "MR efficiency using automated MRI-desktop eProtocol," in Medical Imaging 2017: Imaging Informatics for Healthcare, Research, and Applications, vol. 10138, pp. 101380Z, 2017.

F. Gao et al., "SD-CNN: A shallow-deep CNN for improved breast cancer diagnosis," Comput. Med. Imaging Graph., vol. 70, pp. 53-62, 2018.

(56) References Cited

OTHER PUBLICATIONS

F. Gao, et al., "Deep Residual Inception Encoder-Decoder Network for Medical Imaging Synthesis," IEEE J. Biomed. Heal. Informatics, vol. 24, No. 1, pp. 39-49, Jan. 2020.

F. Gao, et al., "AD-Net: Age-adjust neural network for improved MCI to AD conversion prediction," NeuroImage Clin., pp. 102290, 2020.

N. Harder, et al., "Automated Recognition of Mitotic Patterns in Fluorescence Microscopy Images of Human Cells," in Proceedings of the 3rd IEEE International Symposium on Biomedical Imaging: Nano to Macro, pp. 1016-1019, 2006.

M. Heilmann, et al., "Quantification of Glomerular Number and Size Distribution in Normal Rat Kidneys Using Magnetic Resonance Imaging," Nephrology Dialysis Transplantation, vol. 27, No. 1, pp. 100-107, Jan. 1, 2012.

L. Hermoye, et al., "Calculation of the Renal Perfusion and Glomerular Filtration Rate From the Renal Impulse Response Obtained With MRI", Magnetic Resonance in Medicine, vol. 51, No. 5, pp. 1017-1025, 2004.

D. J. Ho, et al., "Nuclei detection and segmentation of fluorescence microscopy images using three dimensional convolutional neural networks," in Proceedings—International Symposium on Biomedical Imaging, pp. 418-422, 2018.

W. E. Hoy, et al., "Nephron Number, Glomerular Volume Renal Disease and Hypertension," Current Opinion in Nephrology and Hypertension, vol. 17, No. 3, pp. 258-265, 2008.

A. Janowczyk, et al., "Deep learning for digital pathology image analysis: A comprehensive tutorial with selected use cases," J. Pathol. Inform., vol. 7, No. 1, pp. 29, 2016.

M. N. Kashif, et al., "Handcrafted features with convolutional neural networks for detection of tumor cells in histology images," in Proceedings—International Symposium on Biomedical Imaging, pp. 1029-1032, 2016.

M. Khoshdeli, et al., "Feature-Based Representation Improves Color Decomposition and Nuclear Detection Using a Convolutional Neural Network," IEEE Trans. Biomed. Eng., vol. 65, No. 3, pp. 625-634, Mar. 2018.

G. Kindlmann, et al., "Curvature-Based Transfer Functions for Direct Volume Rendering: Methods and Applications", in Proceedings of the 14th IEEE Visualization Conference (VIS'03), pp. 513-520, 2003.

R. Komatsu, et al., "Effectiveness of U-Net in Denoising RGB Images," Comput. Sci. Inf. Techn, pp. 1-10, 2019.

J. Kong, et al., "Computer-Aided Evaluation of Neuroblastoma on Whole-Slide Histology Images: Classifying Grade of Neuroblastic Differentiation," Pattern Recognition, vol. 42, No. 6, pp. 1080-1092, 2009.

H. Kong, et al., "Partitioning Histopathological Images: An Integrated Framework for Supervised Color-Texture Segmentation and Cell Splitting," IEEE Transactions on Medical Imaging, vol. 30, No. 9, pp. 1661-1677, Sep. 2011.

H. Kong, et al., "A Generalized Laplacian of Gaussian Filter for Blob Detection and its Applications," IEEE Transactions on Cybernetics, vol. 43, No. 6, pp. 1719-1733, 2013.

C. F. Koyuncu, et al., "Smart Markers for Watershed-Based Cell Segmentation," PLOS ONE, vol. 7, Issue 11, e48664, Nov. 2012.

G. Lee, et al., "Predicting Alzheimer's disease progression using multi-modal deep learning approach," Sci. Rep., vol. 9, No. 1, pp. 1-12, 2019.

H.-H. Lin, et al., "Cell Segmentation and NC Ratio Analysis of Third Harmonic Generation Virtual Biopsy Images Based on Marker-Controlled Gradient Watershed Algorithm," in Proceedings of the IEEE International Symposium on Circuits and Systems (ISCAS), pp. 101-104, 2012.

T. Lindeberg, "Feature Detection with Automatic Scale Selection," Int. J. Comput. Vis., vol. 30, No. 2, pp. 79-116, 1998.

G. Litjens, et al., "Computer-aided detection of prostate cancer in MRI," IEEE Trans. Med. Imaging, vol. 33, No. 5, pp. 1083-1092, 2014.

S. Liu, et al., "Multimodal Neuroimaging Feature Learning for Multiclass Diagnosis of Alzheimer's Disease," IEEE Trans. Biomed. Eng., vol. 62, No. 4, pp. 1132-1140, Apr. 2015.

M. Liu, et al., "Classification of alzheimer's disease by combination of convolutional and recurrent neural networks using FDG-PET images," Front. Neuroinform., vol. 12, pp. 35, 2018.

A. Lord, et al., "Brain parcellation choice affects disease-related topology differences increasingly from global to local network levels", Psychiatry Research: Neuroimaging, vol. 249, pp. 12-19, 2016.

F. Mahmood, et al., "Deep Adversarial Training for Multi-Organ Nuclei Segmentation in Histopathology Images," IEEE Trans. Med. Imaging, vol. 39, No. 11, pp. 3257-3267, Nov. 2020.

I. Mendichovszky, et al., "How Accurate is Dynamic Contrast-Enhanced MRI in the Assessment of Renal Glomerular Filtration Rate? A Critical Appraisal", Journal of Magnetic Resonance Imaging, vol. 27, No. 4, pp. 925-931, 2008.

F. Meyer, "Topographic Distance and Watershed Lines", Signal processing, vol. 38, No. 1, pp. 113-125, 1994.

K. Mikolajczyk, et al. "Scale & Affine Invariant Interest Point Detectors," International Journal of Computer Vision, vol. 60, No. 1, pp. 63-86, 2004.

K. Nandy, et al., "Automatic Segmentation and Supervised Learning-based Selection of Nuclei in Cancer Tissue Images," Cytometry Part A, vol. 81A, No. 9, pp. 743-754, 2012.

S. K. Nath, et al., "Cell Segmentation Using Coupled Level Sets and Graph-Vertex Coloring," in Proceedings of the International Conference on Medical Image Computing and Computer-Assisted Intervention (MICCAI), pp. 101-108, 2006.

N. Otsu, "A threshold selection method from gray-level histograms," IEEE Trans. Syst. Man Cybern., vol. 9, No. 1, pp. 62-66, 1979.

H. T. H. Phan, et al., "Optimizing contextual feature learning for mitosis detection with convolutional recurrent neural networks," in Proceedings—International Symposium on Biomedical Imaging, pp. 240-243, 2019.

S. E. A. Raza, et al., "Deconvolving convolutional neural network for cell detection," in Proceedings—International Symposium on Biomedical Imaging, pp. 891-894, 2019.

R. Rouhi, et al., "Benign and malignant breast tumors classification based on region growing and CNN segmentation," Expert Syst. Appl., vol. 42, No. 3, pp. 990-1002, 2015.

C. Russell, et al., "Using the Pn Potts Model with Learning Methods to Segment Live Cell Images," in Proceedings of the IEEE 11th International Conference on Computer Vision (ICCV), 2007, pp. 1-8, 2007.

J. M. Sharif, et al., "Red Blood Cell Segmentation Using Masking and Watershed Algorithm: A Preliminary Study," in Proceedings of the 2012 International Conference on Biomedical Engineering (ICoBE), pp. 258-262, Feb. 2012.

E. Shelhamer, et al., "Fully Convolutional Networks for Semantic Segmentation," IEEE Trans. Pattern Anal. Mach. Intell., vol. 39, No. 4, pp. 640-651, Apr. 2017.

Y. Song, et al., "Dynamic residual dense network for image denoising," Sensors (Switzerland), vol. 19, No. 17, pp. 3809, 2019.

S.P. Sourbron, et al., "MRI-Measurement of Perfusion and Glomerular Filtration in the Human Kidney with a Separable Compartment Model", Investigative Radiology, vol. 43 No. 1, pp. 40-48, Jan. 2008.

P. Szeptycki, et al., "Conformal Mapping-Based 3D Face Recognition," in Proceedings of the Fifth International Symposium on 3D Data Processing, Visualization and Transmission, pp. 1-8, 2010.

P.S. Tofts, et al., "Precise Measurement of Renal Filtration and Vascular Parameters Using a Two-Compartment Model for Dynamic Contrast-Enhanced MRI of the Kidney Gives Realistic Normal Values", European Radiology, vol. 22, No. 6, pp. 1320-1330, 2012.

D. Tomar, et al., "Nucleo-Cytophasmic Trafficking of TRIM8, a Novel Oncogene, is Involved in Positive Regulation of TNF Induced NF-kB Pathway," PLOS One, vol. 7, Issue 11, e48662, Nov. 2012.

M. G. Uberti, et al., "A Semi-Automatic Image Segmentation Method for Extraction of Brain Volume from In Vivo Mouse Head

(56) References Cited

OTHER PUBLICATIONS

Magnetic Resonance Imaging Using Constraint Level Sets," Journal of Neuroscience Methods, Elsevier, Ltd., vol. 179, No. 2, pp. 338-344, 2009.

N. Wahab, et al., "Transfer learning based deep CNN for segmentation and detection of mitoses in breast cancer histopathological images," Microscopy, vol. 68, No. 3, pp. 216-233, 2019.

Y. Wang, et al., "Shape Analysis with Conformal Invariants for Multiply Connected Domains and its Application to Analyzing Brain Morphology," in Proceedings of the IEEE Conference on Computer Vision and Pattern Recognition (CVPR), pp. 202-209, 2009.

H. Wang, et al., "Clump Splitting via Bottleneck Detection and Shape Classification," Pattern Recognition, Elsevier Ltd., vol. 45, No. 7, pp. 2780-2787, 7, 2012.

Q. Wen, et al., "A Delaunay Triangulation Approach for Segmenting Clumps of Nuclei," in Proceedings of the IEEE International Symposium on Biomedical Imaging: From Nano to Macro, pp. 9-12, 2009.

T. Wu, et al., "Quantitative Imaging System for Cancer Diagnosis and Treatment Planning: An Interdisciplinary Approach," in the Operations Research Revolution, pp. 153-177, 2017.

L. Xie, et al., "Magnetic Resonance Histology of Age-Related Nephropathy in the Sprague Dawley Rat," Toxicologic Pathology, vol. 40, No. 5, pp. 764-778, 2012.

F. Xing, et al., "An automatic learning-based framework for robust nucleus segmentation," IEEE Trans. Med. Imaging, vol. 35, No. 2, pp. 550-566, Feb. 2016.

F. Xing, et al., "Pixel-to-Pixel Learning with Weak Supervision for Single-Stage Nucleus Recognition in Ki67 Images," IEEE Trans. Biomed. Eng., vol. 66, No. 11, pp. 3088-3097, Nov. 2019.

C. Xu, et al., "Snakes, Shapes, and Gradient Vector Flow," IEEE Transactions on Image Processing, vol. 7, No. 3, pp. 359-369, Mar. 1998.

N. Xu, et al., "Object Segmentation Using Graph Cuts Based Active Contours," Science Direct, Computer Vision and Image Understanding, vol. 107, No. 3, pp. 210-224, 2007.

Y. Xu, et al., "U-net with optimal thresholding for small blob detection in medical images," in IEEE International Conference on Automation Science and Engineering, pp. 1761-1767, 2019.

Y. Xu, et al, "Improved small blob detection in 3D images using jointly constrained deep learning and Hessian analysis," Sci. Rep., vol. 10, No. 1, pp. 1-12, 2020.

Y. Xu, et al., "Small Blob Detector Using Bi-Threshold Constrained Adaptive Scales." IEEE transactions on bio-medical engineering vol. 68,9 (2021): 2654-2665.

Y. Xue, et al., "Training Convolutional Neural Networks and Compressed Sensing End-to-End for Microscopy Cell Detection," IEEE Trans. Med. Imaging, vol. 38, No. 11, pp. 2632-2641, Nov. 2019.

F. Yi, et al., "White Blood Cell Image Segmentation Using On-line Trained Neural Network," in Proceedings of the 2005 IEEE, Engineering in Medicine and Biology 27th Annual Conference, pp. 6476-6479, Sep. 2005.

M. Zeng, et al., "Measurement of Single-Kidney Glomerular Filtration Function from Magnetic Resonance Perfusion Renography", European Journal of Radiology, vol. 84, No. 8, pp. 1419-1423, 2015.

Y.-D. Zhang, et al., "Feasibility Study of High-Resolution DCE-MRI for Glomerular Filtration Rate (GFR) Measurement in a Routine Clinical Modal", Magnetic Resonance Imaging, vol. 33, No. 8, pp. 978-983, 2015.

M. Zhang, "Small Blob Detection in Medical Images", PhD Thesis, Arizona State University, May 2015.

M. Zhang, et al., "Small Blob Identification in Medical Images Using Regional Features From Optimum Scale," IEEE Trans. Biomed. Eng., vol. 62, No. 4, pp. 1051-1062, Apr. 2015.

M. Zhang, et al., "Efficient Small Blob Detection Based on Local Convexity, Intensity and Shape Information," IEEE Trans. Med. Imaging, vol. 35, No. 4, pp. 1127-1137, Apr. 2016.

USPTO, Non-Final Rejection, dated Jan. 4, 2018, in U.S. Appl. No. 15/082,095.

USPTO, Notice of Allowance, date Apr. 26, 2018, in U.S. Appl. No. 15/082,095.

PCT; International Search Report & Written Opinion dated Oct. 7, 2014, in PCT Application No. US2014/059545.

* cited by examiner

700

Train U-Net to generate a probability map to detect centroids of blobs.

702

Derive two distance maps with bounded probabilities.

704

Apply Difference of Gaussian (DoG) with an adaptive scale constrained by the bounded distance maps.

706

Apply Hessian analysis for final blob segmentation.

708

DEEP LEARNING BASED BLOB DETECTION SYSTEMS AND METHODS

CROSS-REFERENCE TO RELATED APPLICATIONS

This application is a non-provisional of, and claims priority to and the benefit of U.S. Provisional Application No. 63/164,699, entitled "DEEP LEARNING BASED BLOB DETECTION SYSTEMS AND METHODS," filed on Mar. 23, 2021. The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

FEDERALLY SPONSORED RESEARCH OR DEVELOPMENT

This invention was made with government support under DK110622, RO1 DK111861, and S10 RR019911 awarded by the National Institutes of Health. The government has certain rights in the invention.

TECHNICAL FIELD

The present disclosure relates to image processing and, in particular, systems and methods for blob detection using deep learning.

BACKGROUND

Imaging biomarkers play a significant role in medical diagnostics and in monitoring disease progression and response to therapy. Development and validation of imaging biomarkers involves detection, segmentation, and classification of imaging features, and various conventional deep learning tools have been developed to perform these functions. However, these deep learning tools are strongly affected by image quality. Moreover, there are challenges in detecting objects in images, particularly small objects known as blobs. These challenges include low image resolution, image noise, and overlap among the blobs. Conventional imaging tools were developed to, e.g., precisely map and measure individual glomeruli in kidneys, which would allow detection of kidney pathology. However, such conventional blob detectors are not robust to noise and/or require large datasets for training, leading to high false positive rates and/or limited applicability in medical applications where sample sizes are often small. Thus, these conventional blob detectors are unable to perform measurement of glomeruli in kidneys efficiently and reliably. Accordingly, improved blob detection systems and methods are desirable.

SUMMARY

In various embodiments, systems, methods, and articles of manufacture (collectively, the "system") for blob detection using deep learning are disclosed. In various embodiments, the system may include a non-transitory computer-readable storage medium configured to store a plurality of instructions thereon which, when executed by a processor, cause the system to: train a U-Net and generate a probability map including a plurality of centroids of a plurality of corresponding blobs; derive, from the U-Net, two distance maps with bounded probabilities; apply Difference of Gaussian (DoG) with an adaptive scale constrained by the two distance maps with the bounded probabilities; and apply Hessian analysis and perform a blob segmentation.

In various embodiments, the system may include a multi-threshold, multi-scale small blob detector.

In various embodiments, the two distance maps may include binarized maps of distances between the plurality of centroids of the plurality of corresponding blobs utilized to bound a search space for scales of the DoG.

In various embodiments, the plurality of instructions may be further configured to cause the system to generate a Hessian convexity map using the adaptive scale.

In various embodiments, the plurality of instructions may be further configured to cause the system to eliminate an under-segmentation of the U-Net.

In various embodiments, the system may include a Bi-Threshold Constrained Adaptive Scale (BTCAS) blob detector configured to perform the plurality of instructions.

In various embodiments, the plurality of instructions may include an implementation of a modified fully convolutional network including one or more concatenation paths.

In various embodiments, a method for blob detection using deep learning is disclosed. The method may include: obtaining an image for detecting a plurality of blobs; pre-training a U-Net to generate a probability map to detect a plurality of corresponding centroids of the plurality of blobs; deriving, from the U-Net, two distance maps including bounded probabilities; deriving, from the two distance maps, a plurality of bounded scales; smoothing each window of each centroid of the plurality of centroids with a Difference of Gaussian (DoG) filter, wherein the DoG filter includes an adaptive optimum scale constrained by the bounded scales; conducting a Hessian analysis on the smoothed window of the each centroid; and identifying a plurality of final segmented voxels sets corresponding to the plurality of blobs.

In various embodiments, the image may include an image of kidney glomeruli.

In various embodiments, the deriving the two distance maps may include minimizing a global loss function $$\mathcal{L}(\Theta) = \frac{1}{N}\sum_{i=1}^{n} \text{loss}(Y, \mathcal{F}(X;\Theta)),$$

wherein: the X is an input image; the Y is a denoised image; the N is a sample size; the $\mathcal{F}(X;\Theta)$ is a probability map mapping the X to the Y by learning and optimizing the parameters $\Theta$ of convolutional and deconvolutional kernels, followed by a sigmoid activation function; and the loss(·) is a binary cross entropy loss function.

In various embodiments, the binary cross entropy loss function may be defined as $$\text{loss}(Y, \mathcal{F}(X;\Theta)) = \\ -\frac{1}{I_1 I_2 I_3}\sum_{k=1}^{I_1 \times I_2 \times I_3} y_k \cdot \log(\mathcal{F}_k(X;\Theta)) + (1-y_k)\cdot \log(1-\mathcal{F}_k(X;\Theta))$$

wherein: the $I_1$, $I_2$, and $I_3$ are dimensions of the image; the $y_k$ is a true label; and the $\mathcal{F}_k(X;\Theta)$ is a predicted probability for a voxel k.

In various embodiments, the method may further include outputting, to a computer in communicative connection with the U-Net, a count of the plurality of blobs in the image.

In various embodiments, the conducting the Hessian analysis may include eliminating an under-segmentation of the U-Net.

In various embodiments, an apparatus for blob detection using deep learning is disclosed. The apparatus may include a non-transitory computer-readable storage medium configured to store a plurality of instructions thereon which, when executed by a processor, cause the apparatus to: train a U-Net and generate a probability map including a plurality of centroids of a plurality of corresponding blobs; derive, from the U-Net, two distance maps with bounded probabilities; apply Difference of Gaussian (DoG) with an adaptive scale constrained by the two distance maps with the bounded probabilities; and apply Hessian analysis and perform a blob segmentation.

In various embodiments, the apparatus may include a multi-threshold, multi-scale small blob detector.

In various embodiments, the plurality of instructions may be further configured to cause the apparatus to generate a Hessian convexity map using the adaptive scale.

In various embodiments, the plurality of instructions may be further configured to cause the apparatus to eliminate an under-segmentation of the U-Net.

In various embodiments, the apparatus may include a Bi-Threshold Constrained Adaptive Scale (BTCAS) blob detector configured to perform the plurality of instructions.

The foregoing features and elements may be combined in various combinations without exclusivity, unless expressly indicated herein otherwise. These features and elements as well as the operation of the disclosed embodiments will become more apparent in light of the following description and accompanying drawings. The contents of this section are intended as a simplified introduction to the disclosure, and are not intended to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

Figure 1:
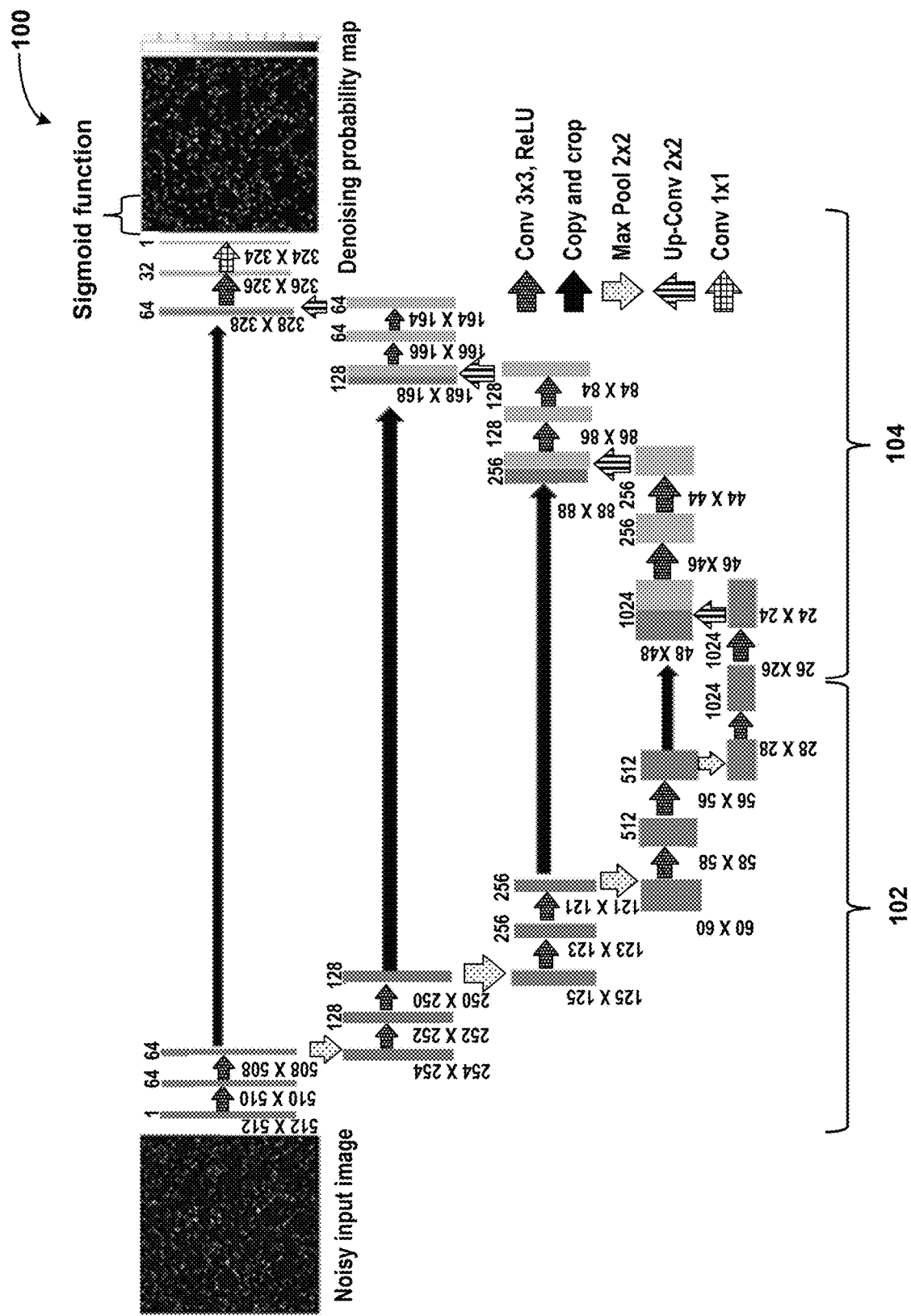
FIG. 1 illustrates use of a modified fully convolutional neural network (U-Net) in accordance with various exemplary embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

For the sake of brevity, conventional techniques for blob detection, deep learning, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in practical blob detection systems or methods.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and/or the like in digital or any other form.

As used herein, "satisfy," "meet," "match," "associated with," or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Systems, methods, and computer program products are provided. In the detailed description herein, references to "various embodiments," "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Principles of the present disclosure contemplate use of advanced techniques for detecting and enumerating blobs, for example, kidney glomeruli. The systems and methods disclosed herein may be utilized to process and/or evaluate images, such as medical images of kidneys.

Systems and methods disclosed herein include Bi-Threshold Constrained Adaptive Scale (BTCAS) blob detector configured for determining a relationship between U-Net threshold and Difference of Gaussian (DoG) scale to derive a multi-threshold, multi-scale small blob detector. With lower and upper bounds on the probability thresholds from U-Net, two binarized maps of distance may be rendered between blob centers. Each blob may be transformed into a DoG space with an adaptively identified local optimum scale. Furthermore, a Hessian convexity map may be rendered using the adaptive scale, and advantageously, an under-segmentation typical of the U-Net may be resolved thereby.

To validate the performance of the BTCAS blob detector described herein, a 3D (three-dimensional) simulated dataset (n=20) of blobs, a 3D MRI (magnetic resonance imaging) dataset of human kidneys, and a 3D MM dataset of mouse kidneys were studied. During the validation, the BTCAS systems and methods were compared against four other methods—HDoG (Hessian-based Difference of Gaussians), U-Net with standard thresholding, U-Net with optimal thresholding, and UH-DoG (U-Net and Hessian-based Difference of Gaussians)—using Precision, Recall, F-score, Dice coefficient, and IoU (Intersection over Union), and the BTCAS systems and methods were found to statistically outperform the compared detectors.

With respect to the present disclosure, monotonicity of U-Net probability map was first shown, laying a foundation for the blob detector described herein. With lower and upper bounds on probability thresholds, two binarized maps of distance between blob centers were then rendered. Since the true blob would fall between the two distance maps with a specified level of certainty, the search space for the DoG scales was bounded. Each blob could then be transformed to an optimum local DoG space locally (e.g., instead of by a single global optimum scale). Then, a Hessian convexity map was rendered using an adaptive scale, and under-segmentation typical of U-Net was resolved.

Then, to validate the performance of the BTCAS blob detector described herein, a 3D simulated dataset (n=20) where locations of blobs were known was studied and compared against other methods. Then, blob detection using these methods applied to a 3D image of three human kidneys and a set of 3D images of mouse kidneys from CFE-MRI (cationic ferritin-enhanced magnetic resonance imaging) was compared against the HDoG, UH-DoG, and stereology.

Methods

Systems and methods for Bi-Threshold Constrained Adaptive Scale (BTCAS) blob detector disclosed herein include two steps to detect blobs (e.g., glomeruli) from CFE-MRI of kidneys: (1) training U-Net to generate a probability map (e.g., denoising a raw image) to detect the centroids of the blobs, and then deriving two distance maps with bounded probabilities; and (2) applying the Difference of Gaussian (DoG) with an adaptive scale constrained by the bounded distance maps, followed by Hessian analysis for final blob segmentation.

Bi-Threshold Distance Maps from U-Net

In various embodiments and with reference to FIG. 1, U-Net 100 (a modified fully convolutional network) includes an encoding path 102 and a decoding path 104. The encoding path 102 has four blocks. Within each block, there are two 3×3 convolutional layers (Conv 3×3), a rectified linear unit (ReLU) layer, and a 2×2 max-pooling layer (Max pool 2×2). After each max-pooling layer, the resolution of the feature maps is halved, and the channel is doubled as shown in FIG. 1. The input images are compressed by layer through the encoding path 102. A corresponding decoding path 104 performs an inverse operation to generate an output including a reconstructed probability map of the same size as the input images. The resolution is increased by layer through the decoding path 104. To transfer information from the encoding path 102 to the decoding path 104, concatenation paths are added between them, marked by solid black arrows as shown in FIG. 1. The final layer is a 1×1 convolutional layer (Conv 1×1), followed by a sigmoid function as shown. This sigmoid function ensures that the resultant output is a probability map.

In some embodiments including supervised learning applications where the output labeling is known, U-Net 100 may be directly used as a model for segmentation. In some embodiments wherein the output labeling is unknown, U-Net 100 may be used to process and denoise the images. Here, since the ground truth is unknown, the denoising capabilities of U-Net 100 are investigated. It is noted that, for CFE-MRI of kidneys, the glomeruli are extremely small—similar to noise that can be potentially removed by autoencoders. Thus, with a major difference between U-Net and autoencoders being that U-Net has concatenation paths which can transfer fine-grained information from low layers to high layers to increase the performance of the segmentation results, U-Net may advantageously (e.g., over autoencoder model) remove background noise from the MR images while simultaneously enhancing the glomerular detection.

Let $X \in [0,1]^{I_1 \times I_2 \times I_3}$ be the input image and $Y \in \{0,1\}^{I_1 \times I_2 \times I_3}$ be the image after being denoised. For simplicity, input image X may be assumed to have Gaussian noise E. Then, X may be shown as:

$$X = Y + \varepsilon, \varepsilon \sim \mathcal{N}(0, \sigma^2 I). \quad (1)$$

In various embodiments, U-Net 100 is to obtain a function $\mathcal{F}(\cdot)$ mapping X to Y by learning and optimizing the parameters $\Theta$ of convolutional and deconvolutional kernels. This may be achieved by minimizing the global loss function:

$$\mathcal{L}(\Theta) = \frac{1}{N} \sum_{i=1}^{n} \text{loss}(Y, \mathcal{F}(X; \Theta)), \quad (2)$$

where N is a sample size, $\mathcal{F}(X; \Theta) \in [0,1]^{I_1 \times I_2 \times I_3}$ is the probability map followed by the sigmoid activation function, and loss(·) is a binary cross entropy loss function defined as:

$$\text{loss}(Y, \mathcal{F}(X;\Theta)) = \qquad (3)$$
$$-\frac{1}{I_1 I_2 I_3}\sum_{k=1}^{I_1 \times I_2 \times I_3} y_k \cdot \log(\mathcal{F}_k(X;\Theta)) + (1-y_k)\cdot \log(1-\mathcal{F}_k(X;\Theta)),$$

where $y_k \in \{0,1\}$ is the true label and $\mathcal{F}_k(X;\Theta) \in [0,1]$ is the predicted probability for voxel k. After denoising, the output of Y( ) may approximate Y:

$$\mathcal{F}(X;\Theta) \approx Y. \qquad (4)$$

In various embodiments, glomeruli in CFE-MR images are roughly spherical in shape, with varying image magnitudes. Based on this observation, Proposition 1 may be developed. Proposition 1 as well as Proposition 2 discussed herein are described with more detail in a separate section of the present disclosure.

A first use of Proposition 1 may be to identify the centroid of any blob. From Proposition 1, the centroid of any bright blob may reach maximum probability. Therefore, a regional maximum function RM may be applied to the probability map U(x, y, z) to find voxels with maximum probability from the connected neighborhood voxels as blob centroids:

$$RM(U) = \max_{\substack{u \in U(x,y,z) \\ \Delta u \in (-k,k)}} U(u+\Delta u), \qquad (5)$$

where k is the Euclidean distance between each voxel and its neighborhood voxels. The blob centroid set $C=\{C_i\}_{i=1}^N$ may be defined as:

$$C=\{(x,y,z)|(x,y,z) \in \arg RM(U(x,y,z))\}. \qquad (6)$$

Here, k=1. Each blob centroid $C_i \in C$ may have maximum probability within 6-connected neighborhood voxels.

A second use of Proposition 1 may be to binarize the probability map with a confidence level. Otsu's thresholding may be used first to remove noise and voxels in the blob centroids, and to extract the probability distribution of blob voxels. Next, instead of using single threshold, the two-sigma rule may be applied to the distribution to identify the lower probability $\delta_L$ and higher probability $\delta_H$ covering 95% range of the probabilities. As a result, the probability map may then be binarized to $B_L(x, y, z) \in \{0,1\}^{I_1 \times I_2 \times I_3}$ and $B_H(x, y, z) \in \{0,1\}^{I_1 \times I_2 \times I_3}$.

$$B_{L/H}(x, y, z) = \begin{cases} 1, & U(x, y, z) \geq \delta_{L/H} \\ 0, & U(x, y, z) < \delta_{L/H} \end{cases} \qquad (7)$$

From Proposition 2, $B_L(x, y, z)$ may approximate a blob with larger size and $B_H(X, y, z)$ may approximate a blob with smaller size. Without loss of generality, B(x,y,z) may be a binarized probability map and $\Omega=\{(x, y, z)|B(x, y, z)=1\}$ may be defined as the set of blob voxels and $\partial\Omega$ the set of boundary voxels. d(·) is the Euclidean distance function of any two voxels. The Euclidean distance between each voxel and the nearest boundary voxels may be:

$$d(p, \partial\Omega) = \min_{\substack{p \in \Omega \\ q \in \partial\Omega}} d(p, q). \qquad (8)$$

Given $B_L(x,y,z)$ and $B_H(x,y,z)$, two distance maps may be derived, $D_L(x,y,z) \in R^{I_1 \times I_2 \times I_3}$ and $D_H(x, y, z) \in R^{I_1 \times I_2 \times I_3}$ respectively.

Figure 2A:
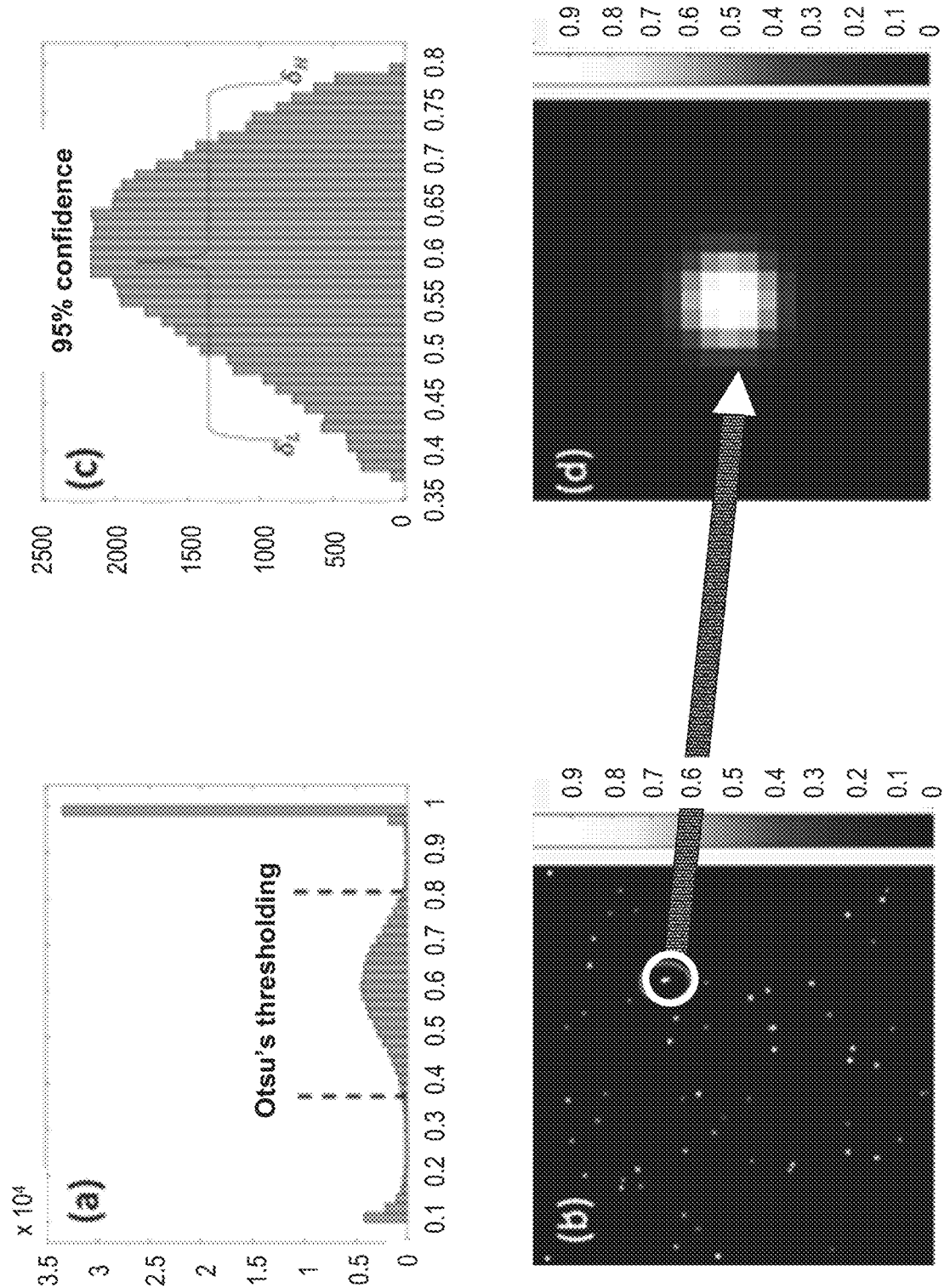
FIGS. 2A and 2B illustrate a process of deriving a distance map from a U-Net in accordance with various exemplary embodiments.
Figure 2B:
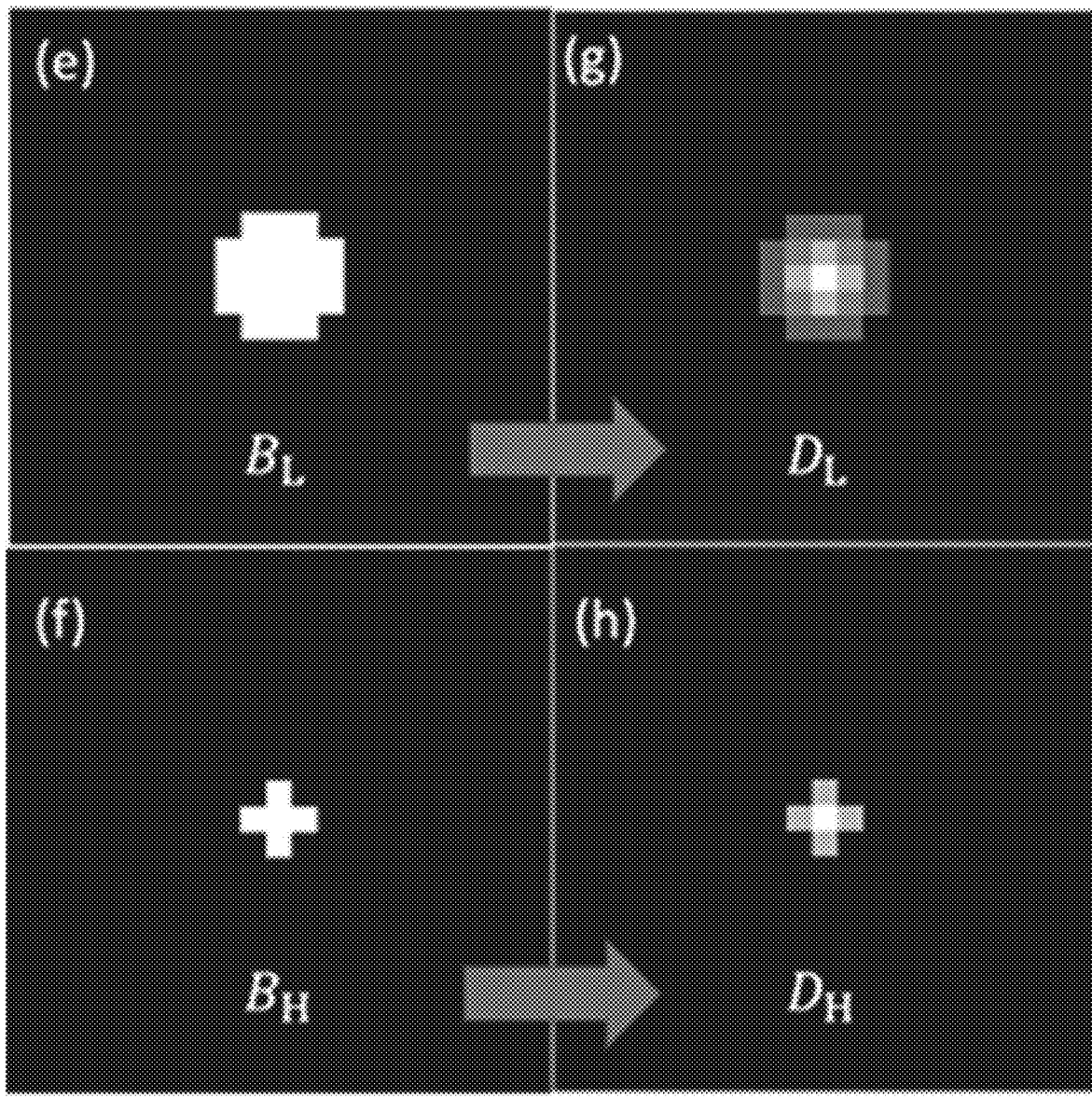

With reference to FIGS. 2A and 2B, the process of deriving binarized distance maps from a probability map is described herein. The plot (a) in FIG. 2A illustrates a probability distribution of a probability map. The image (b) in FIG. 2A shows a visualization of the probability map. The plot (c) in FIG. 2A shows a probability distribution after applying Otsu's thresholding. The image (d) in FIG. 2A shows a visualization of a blob's probability. The image (e) in FIG. 2B shows a binarized probability map $B_L$ under low threshold $\delta_L$. The image (f) in FIG. 2B shows a binarized probability map $B_H$ under high threshold $\delta_H$. The image (g) in FIG. 2B shows a distance map $D_L$ derived from $B_L$. The image (h) in FIG. 2B shows a distance map $D_H$ derived from $B_H$.

For each blob centroid $C_i \in C$ (see (9)), radius $r_i$ of blob i may be approximated as:

$$r_i \in (D_H(C_i), D_L(C_i)). \qquad (9)$$

As known in the relevant art, the smoothing scale in DoG is positively correlated with the blob radius. Here, the bounded radius information in (9) may be used to constrain the adaptive scales in DoG imaging smoothing, as described further herein.

Bounded Adaptive Scales in DoG and Hessian Analysis

For a normalized 3D image $X(x, y, z) \in [0,1]^{I_1 \times I_2 \times I_3}$, a DoG filter is $$DoG(x, y, z; s) = X(x, y, z) * \frac{(G(x, y, z; s+\Delta s) - G(x, y, z; s))}{\Delta s}, \qquad (10)$$

where s is a scale value, * is convolution operator, and Gaussian kernel $$G(x, y, z; s) = \frac{1}{(2\pi s^2)^{\frac{3}{2}}} e^{-\frac{(x^2+y^2+z^2)}{2s^2}}.$$

The DoG filter smooths the image more efficiently in 3D than the Laplace of Gaussian (LoG) filter does. In various embodiments addressing challenge(s) in determining the optimum DoG scale in blob detection, the distance maps ($D_L$ and $D_H$) from U-Net 100 may be applied to constrain the DoG scale for scale inference. Specifically, for d-dimensional images, the DoG may reach a maximum response under scale $s=r/\sqrt{d}$. In a 3D image, the range of scale for each blob may be $s_i \in (s_i^L, s_i^H)$, and substituting r with (9) results in:

$$s_i^L = D_H(C_i)/\sqrt{3} \qquad (11)$$

$$s_i^H = D_L(C_i)/\sqrt{3} \qquad (12)$$

For each blob, a normalized $DoG_{nor}(x,y,z;s_i)$ with multi-scale $s_i \in (s_i^L, s_i^H)$ may be applied on a small 3D window with size N×N×N (N>2*$D_L(C_i)$) and window center being the blob centroid $C_i \in C$. For each voxel (x, y, z) in $DoG_{nor}(x,y,z;s_i)$ at scale $s_i$, the Hessian matrix for this voxel may be:

$$H(DoG_{nor}(x, y, z; s_i)) = \begin{bmatrix} \frac{\partial^2 DoG_{nor}(x, y, z; s_i)}{\partial x^2} & \frac{\partial^2 DoG_{nor}(x, y, z; s_i)}{\partial x \partial y} & \frac{\partial^2 DoG_{nor}(x, y, z; s_i)}{\partial x \partial z} \\ \frac{\partial^2 DoG_{nor}(x, y, z; s_i)}{\partial x \partial y} & \frac{\partial^2 DoG_{nor}(x, y, z; s_i)}{\partial y^2} & \frac{\partial^2 DoG_{nor}(x, y, z; s_i)}{\partial y \partial z} \\ \frac{\partial^2 DoG_{nor}(x, y, z; s_i)}{\partial x \partial z} & \frac{\partial^2 DoG_{nor}(x, y, z; s_i)}{\partial y \partial z} & \frac{\partial^2 DoG_{nor}(x, y, z; s_i)}{\partial z^2} \end{bmatrix} \quad (13)$$

In a normalized DoG-transformed 3D image, each voxel of a transformed bright or dark blob may have a negative or positive definite Hessian. Taking a bright blob as an example, the Hessian convexity window, HW (x, y, z; $s_i$), may be defined as a binary indicator matrix:

$$HW(x, y, z; s_i) = \begin{cases} 1, & \text{if } H(DoG_{nor}(x, y, z; s_i)) \text{ is negative definite} \\ 0, & \text{otherwise} \end{cases} \quad (14)$$

In various embodiments, for each blob with centroid $C_i \in C$, the average DoG value for each window $BW_{DoG}$ may be:

$$BW_{DoG}(s_i) = \frac{\sum_{(x,y,z)} DoG(x, y, z) HW(x, y, z; s_i)}{\sum_{(x,y,z)} HW(x, y, z; s_i)}. \quad (15)$$

The optimum scale $s_i^*$ for each blob may be determined if $BW_{DoG}(s_i^*)$ is maximum with $s_i \in (s_i^L, s_i^H)$. The optimum scale $s_i^*$ may be derived for each blob with centroid $C_i \in C$, and the final segmented blob set $S_{blob}$ may be:

$$S_{blob} = \{(x,y,z) | (x,y,z) \in DoG_{nor}(x,y,z;s_i), HW(x,y,z;s_i^*) = 1\}. \quad (16)$$

The details of an exemplary BTCAS blob detector discussed herein are summarized in Table I.

TABLE I

PSEUDOCODE FOR BTCAS BLOB DETECTOR

1. Use a pretrained model to generate a probability map of blobs from original image.
2. Initialize probability range ($\delta_L, \delta_H$) and thresholding probability map to get binarized map B(x, y, z) and distance map D(x, y, z)
3. Calculate the blob centroids set C from probability map U(x, y, z). For each blob with centroid $C_i \in C$, get the scale range ($s_i^L, s_i^H$).
4. For each blob with centroid $C_i \in C$, transform raw image window of blob to multi-scale DoG space with scale $s_i \in (s_i^L, s_i^H)$.
5. Calculate the Hessian matrix based on normalized DoG smoothed window and generate the Hessian convexity window HW(x, y, z; $s_i$).

6. Calculate average $DoG$ intensity of each window $BW_{DoG}(s) = \frac{\sum_{(x,y,z)} DoG(x, y, z) HW(x, y, z; s)}{\sum_{(x,y,z)} HW(x, y, z; s)}$ and find the optimum scale for each blob by $s_i^* = \text{argmax } BW_{DoG}(s_i)$ 7. Get the optimum Hessian convexity window HW(x, y, z; $s_i^*$) under scale $s_i^*$.
8. Identify the final segmented blob voxels set $S_{blob}$.

EXPERIMENTS AND RESULTS

Training Dataset and Data Augmentation

Figure 3:
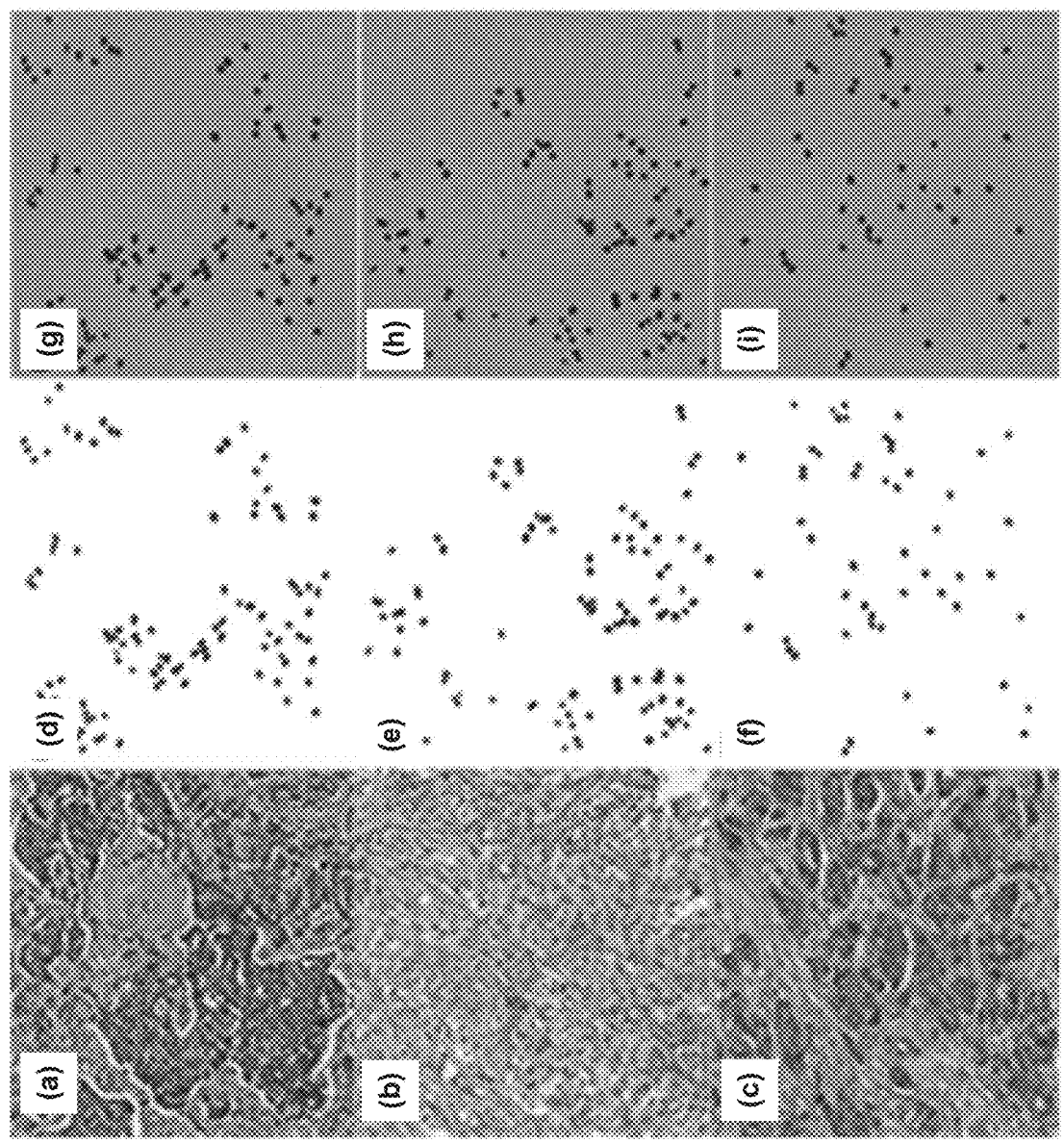
FIG. 3 are images related to training dataset of U-Net for an experiment conducted in accordance with various exemplary embodiments.

As part of an experiment, a public dataset of optical images of cell nuclei was used to train U-Net (e.g., U-Net 100). This dataset contained 141 pathology images (2,000× 2,000 pixels). The 12,000 ground truth annotations were provided by a domain expert, which involved delineating object boundaries over 40 hours. Since the aim was to facilitate U-Net to denoise blobs images based on ground truth labeled images, Gaussian distributed noise with $\mu_{noise}=0$ and $\sigma_{noise}^2=0.01$ was generated, which were added to the labeled images, resulting in 141 synthetic training images as shown in FIG. 3 ((g)-(i)). As a brief aside and with reference to FIG. 3, images (a)-(c) are original images, images (d)-(f) are ground truth labeled images for image (a)-(c), and images (g)-(i) are synthetic training images based on images (d)-(f). Data were augmented to increase the invariance and robustness of U-Net. The augmented data were generated by a combination of rotation shift, width shift, height shift, shear, zoom, and horizontal flip. The trained model was validated using 3D synthetic image data and 3D MR image data.

Experiment I: Validation Experiments Using 3D Synthetic Image Data 20 3D images with 10 different numbers of blobs and two different levels of noise were simulated. From each 3D image (sized 256×256×256), blobs were generated using the Gaussian function with parameter s=1 for blob size. The radii of the blobs were approximated as (2×s+0.5) voxels, based on observation. Blobs were spread on the images at random locations. The number of blobs (N) ranged from 5,000 to 50,000 with a step size of 5,000. Noise was generated by the Gaussian function with $\mu_{noise}=0$ and $\sigma_{noise}^2$ defined by:

$$\sigma_{noise}^2 = \frac{\sigma_{image}^2}{10^{\frac{SNR}{10}}}. \quad (17)$$

Figure 4A:
FIGS. 4A and 4B are images of a 3D synthetic image dataset related to an experiment conducted in accordance with various exemplary embodiments.
Figure 4B:
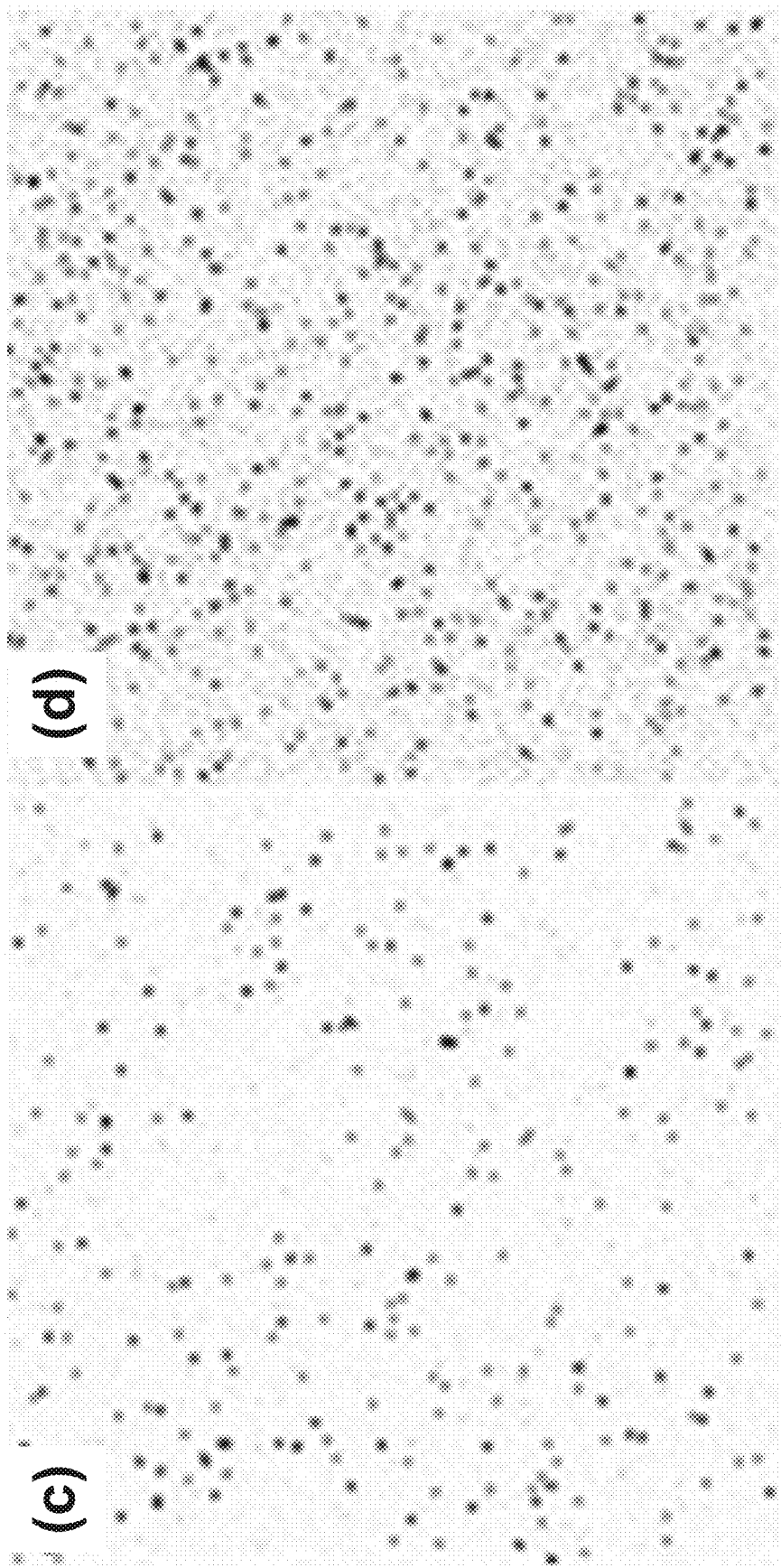

The signal-to-noise ratio (SNR) was set at 1 dB and 5 dB for high noise and low noise, respectively. As the quantity of blobs increased, so did blob density, which resulted in a large number of blobs being closely clumped together (see FIGS. 4A and 4B). FIGS. 4A and 4B show the 3D synthetic images dataset utilized in Experiment I (slice 100 (of 256) from simulated 3D blob images with different parameter settings on the number of blobs and signal-to-noise ratio (SNR) (dB)). Image (a) is 3D blob image with N=5,000 and SNR=1 dB, O=0.04; image (b) is 3D blob image with N=10,000 and SNR=5 dB, O=0.07; image (c) is 3D bob image with N=20,000 and SNR=5 dB, O=0.14; and image (d) is 3D blob image with N=50,000 and SNR=1 dB, O=0.31.

The ratio of overlap (O) of blobs in the 3D image was derived as:

$$O = \frac{N_O}{N_T}. \quad (18)$$

Five methods were applied to the synthetic 3D blob images: four methods including the HDoG, U-Net with standard thresholding, U-Net with optimal thresholding (OT U-Net), and the UH-DoG, as well as the BTCAS blob detector disclosed herein. The parameter settings of the DoG were as follows: window size N of 7, γ of 2, and Δs of 0.001. To denoise the images of the 3D blobs using a trained U-Net, each 256×256 slice was first resized to 512×512, and then each slice was fed into U-Net. Then, Adam optimizer was used in U-Net with a learning rate set to 0.0001. The dropout rate was set to 0.5. The threshold for the U-Net probability map in UH-DoG was set to 0.5. U-Net was implemented on a NVIDIA TITAN XP GPU with 12 GB of memory. Moreover, a 2D (two-dimensional) U-Net was used, and 2D probability maps were rendered on each slice then stacked together to form a 3D probability map.

Evaluating the Number of Blobs Detected

Figure 5A:
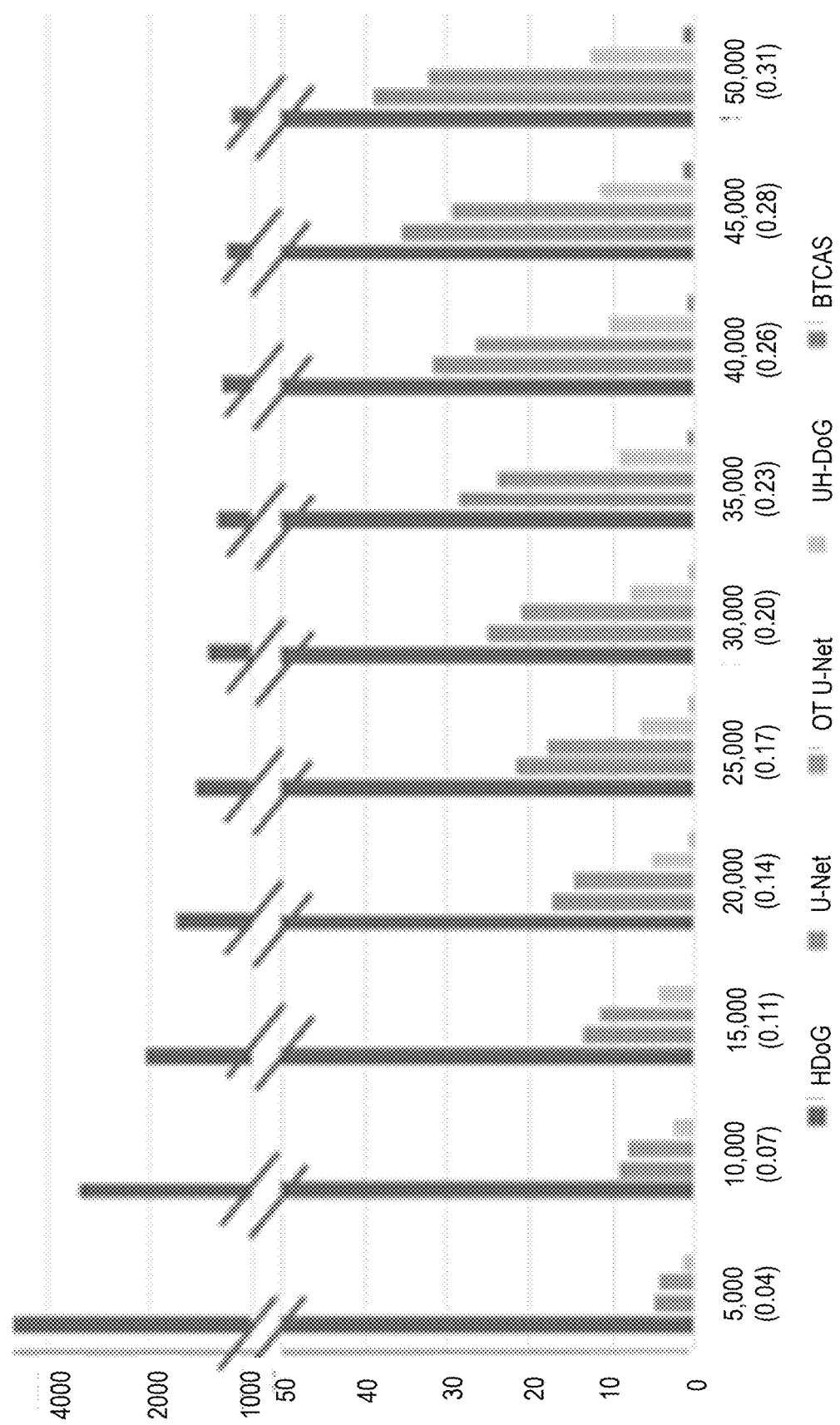
FIG. 5A illustrates a comparison of blob detection error rate (%) of HDoG, U-Net, OT U-Net, UH-DoG, and BTCAS in 3D synthetic blob images with low noise (SNR=5 dB) related to an experiment conducted in accordance with various exemplary embodiments.
Figure 5B:
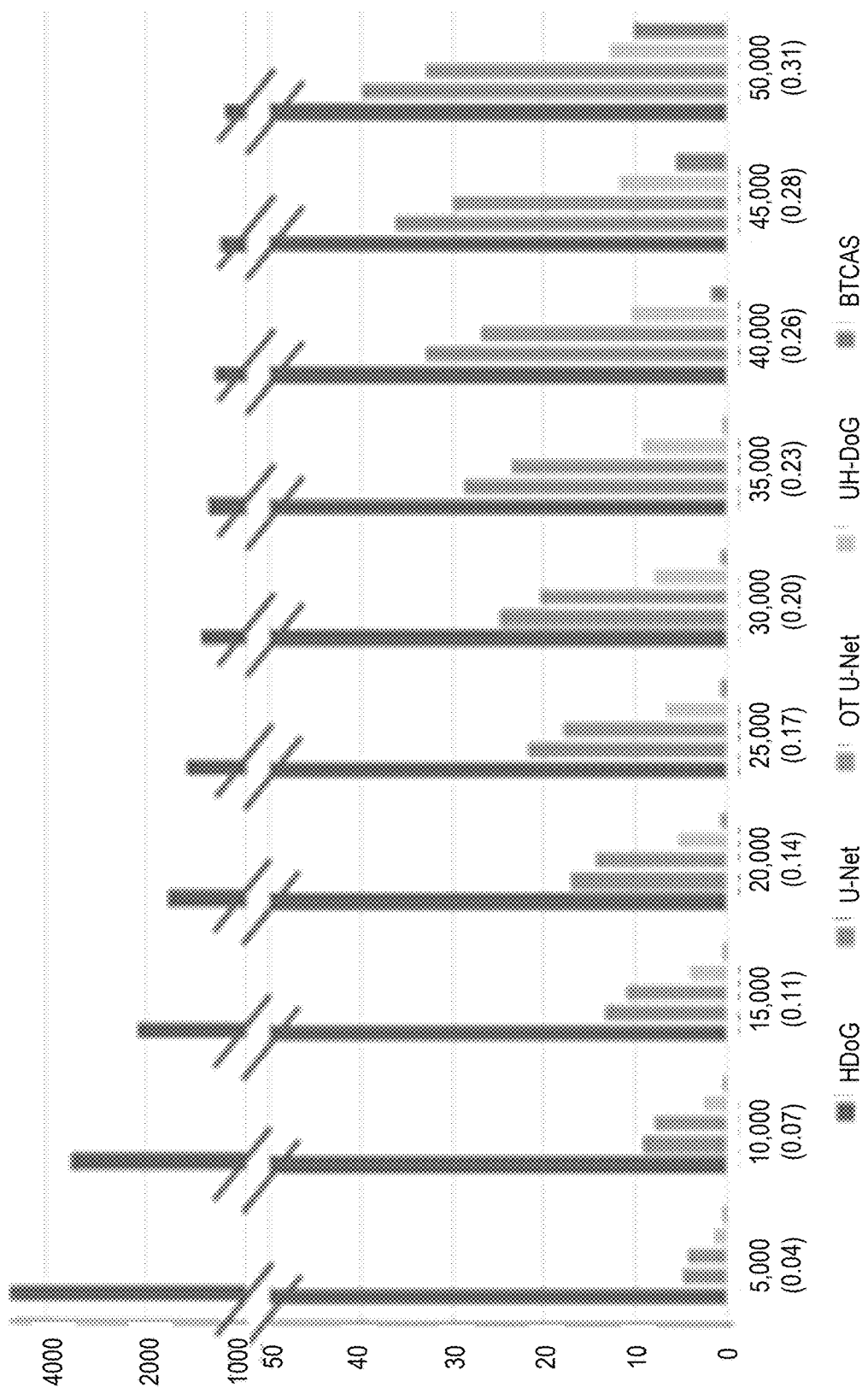
FIG. 5B illustrates a comparison of blob detection error rate (%) of HDoG, U-Net, OT U-Net, UH-DoG and BTCAS in 3D synthetic blob images with high noise (SNR=1 dB) related to an experiment conducted in accordance with various exemplary embodiments.

First, the number of blobs detected from different algorithms and noisy image settings were compared. See FIGS. 5A and 5B. FIG. 5A shows a comparison of blob detection error rate (%) of HDoG, U-Net, OT U-Net, UH-DoG, and BTCAS in 3D synthetic blob images with low noise (SNR=5 dB). Number of true blobs (overlap ratio) ranged from 5,000 (0.04) to 50,000 (0.31). FIG. 5B shows a comparison of blob detection error rate (%) of HDoG, U-Net, OT U-Net, UH-DoG, and BTCAS in 3D synthetic blob images with high noise (SNR=1 dB). Number of true blobs (overlap ratio) ranged from 5,000 (0.04) to 50,000 (0.31).

The HDoG suffered from significant over-detection, yielding a high error rate in both experiments. In other methods, for the experiment on images with low noise, as the number of true blobs increased from 5,000 to 50,000, error rates for U-Net, OT U-Net, and UH-DoG ranged from 4.96-38.78%, 4.28-32.22%, and 1.36-12.60%, respectively. The error rates observed with the BTCAS system disclosed herein were significantly lower, ranging from 0.06-1.44%. For the experiment using images with high noise, as the number of true blobs increased from 5,000 to 50,000, error rates for U-Net, OT U-Net, and UH-DoG ranged from 4.68-39.87%, 4.08-32.96%, and 1.38-12.79%, respectively. BTCAS had error rates of 0.08-10.20%. By integrating U-Net, the detection error decreased, and over-detection was reduced. However, both U-Net and OT U-Net detected fewer blobs than the ground truth. This may be due to overlapping blobs—that is, if the probability values at the boundaries of overlapping blobs are larger than the threshold, under-segmentation occurs, leading to fewer detected blobs. OT U-Net used Otsu's thresholding to find the optimal threshold to reduce under-segmentation. With Hessian analysis, under-segmentation may be eliminated. The UH-DoG and BTCAS outperformed both U-Net and OT U-Net. The error rate of BTCAS slowly increased when the number of blobs increased from 5,000 to 50,000 with low noise and from 5,000 to 40,000 with high noise. Although the error rate of BTCAS increased when the number of blobs increased from 40,000 to 50,000 under high noise, this error rate was significantly lower than that for UH-DoG. Thus, the BTCAS system showed much more robustness in the presence of noise compared to the other four methods.

Evaluating Blob Detection and Segmentation Accuracy

Further, algorithm performance was evaluated by Precision, Recall, F-score, Dice coefficient, and Intersection over Union (IoU). For detection, Precision measures the fraction of retrieved candidates confirmed by the ground-truth. Recall measures the fraction of ground-truth data retrieved. F-score is an overall performance of precision and recall. For segmentation, the Dice coefficient measures a similarity between the segmented blob mask and the ground truth. IoU measures amount of overlap between the segmented blob mask and the ground truth. Ground truth voxels and blob locations (the coordinates of the blob centers) were already generated when synthesizing the 3D blob images. A candidate was considered as a true positive if the centroid of its magnitude was in a detection pair j) for which the nearest ground truth center j had not been paired and the Euclidian distance $D_{ij}$ between ground truth center j and blob candidate i was less than or equal to d. To avoid duplicate counting, the number (#) of true positives TP was calculated by (19). Precision, recall, and F-score were calculated by (20), (21), and (22), respectively.

$$TP = \min\{\#\{(i, j):\min_{i=1}^{m} D_{ij} \le d\}, \#\{(i, j):\min_{j=1}^{n} D_{ij} \le d\}\}, \quad (19)$$

$$\text{precision} = \frac{TP}{n}, \quad (20)$$

$$\text{recall} = \frac{TP}{m}, \quad (21)$$

$$F-\text{score} = 2 \times \frac{\text{precision} \times \text{recall}}{(\text{precision} + \text{recall})}, \quad (22)$$

where m is the number of true glomeruli and n is the number of blob candidates, and d is a thresholding parameter set to a positive value (0, +∞). If d is small, fewer blob candidates may be counted since the distance between the blob candidate centroid and ground-truth would be small. If d is too large, more blob candidates are counted. Here, since local intensity extremes may be anywhere within a small blob with an irregular shape, d was set to the average diameter of the blobs:

$$d = 2 \times \sqrt{\frac{\sum_{(x,y)} I(x, y; s)}{\pi}}.$$

The Dice coefficient and IoU were calculated by comparing the segmented blob mask and ground truth mask by (23) and (24).

$$\text{Dice }(B, G) = \frac{2|B \cap G|}{|B| + |G|}, \quad (23)$$

$$IoU(B, G) = \frac{B \cap G}{B \cup G}, \quad (24)$$

where B is the binary mask for segmentation result and G is the binary mask for the ground truth.

Comparisons between the models are shown in Tables II and III. ANOVA test was performed with Tukey's HSD multi-comparison at significance level 0.05. BTCAS significantly outperformed other four methods on Recall and F-Score for images with low and high noises. Compared to UH-DoG, BTCAS provided better performance on Recall and F-Score and was comparable on Precision, Dice, and IoU. In this synthetic data, the blobs were generated with similar size (s=1); thus, the BTCAS system may still resolve under-segmentation by U-Net.

TABLE II

COMPARISON (AVG ± STD) AND ANOVA USING TUKEY'S HSD PAIRWISE TEST OF BTCAS, HDOG, UH-DOG, U-NET, OT U-NET ON 3D SYNTHETIC IMAGES UNDER SNR = 5 DB (LOW NOISE) (*SIGNIFICANCE p < 0.05)

| METRICS | BTCAS | HDOG | U-NET | OT U-NET | UH-DOG |
|---|---|---|---|---|---|
| PRECISION | 1.00 ± 0.00 | 0.10 ± 0.07 (*<0.0001) | 0.98 ± 0.01 (*<0.0001) | 1.00 ± 0.00 (*<0.0001) | 1.00 ± 0.00 (0.172) |
| RECALL | 0.99 ± 0.00 | 0.99 ± 0.01 (* 0.041) | 0.76 ± 0.12 (*<0.001) | 0.81 ± 0.09 (*<0.0001) | 0.93 ± 0.04 (*<0.001) |
| F-SCORE | 1.00 ± 0.00 | 0.18 ± 0.11 (*<0.0001) | 0.85 ± 0.08 (*<0.001) | 0.89 ± 0.06 (*<0.001) | 0.96 ± 0.02 (*<0.001) |
| DICE | 0.96 ± 0.03 | 0.26 ± 0.14 (*<0.0001) | 0.52 ± 0.00 (*<0.0001) | 0.60 ± 0.04 (*<0.0001) | 0.97 ± 0.02 (*<0.0001) |
| IOU | 0.92 ± 0.05 | 0.16 ± 0.09 (*<0.0001) | 0.35 ± 0.00 (*<0.0001) | 0.43 ± 0.04 (*<0.0001) | 0.94 ± 0.04 (*<0.0001) |

TABLE III

COMPARISON (AVG ± STD) AND ANOVA USING TUKEY'S HSD PAIRWISE TEST OF BTCAS, HDOG, UH-DOG, U-NET, OT U-NET ON 3D SYNTHETIC IMAGES UNDER SNR = 1 DB (HIGH NOISE) (*SIGNIFICANCE p < 0.05)

| METRICS | BTCAS | HDOG | U-NET | OT U-NET | UH-DOG |
|---|---|---|---|---|---|
| PRECISION | 0.98 ± 0.03 | 0.09 ± 0.06 (*<0.0001) | 0.98 ± 0.01 (0.338) | 1.00 ± 0.00 (0.063) | 1.00 ± 0.00 (* 0.035) |
| RECALL | 0.99 ± 0.00 | 0.99 ± 0.01 (* 0.026) | 0.76 ± 0.12 (*<0.001) | 0.81 ± 0.10 (*<0.001) | 0.93 ± 0.04 (*<0.001) |
| F-SCORE | 0.99 ± 0.02 | 0.17 ± 0.10 (*<0.0001) | 0.85 ± 0.08 (*<0.001) | 0.89 ± 0.06 (*<0.0001) | 0.96 ± 0.02 (*<0.001) |
| DICE | 0.92 ± 0.08 | 0.26 ± 0.13 (*<0.0001) | 0.51 ± 0.01 (*<0.0001) | 0.61 ± 0.03 (*<0.0001) | 0.94 ± 0.04 (0.063) |
| IOU | 0.85 ± 0.13 | 0.15 ± 0.09 (*<0.0001) | 0.34 ± 0.00 (*<0.0001) | 0.44 ± 0.03 (*<0.0001) | 0.89 ± 0.07 (0.061) |

Experiment II. Validation Using 3D Human Kidney CFE-MR Images

In this experiment, blob segmentation applied to 3D CFE-MR images was investigated to measure number (Nglom) and apparent volume (aVglom) of glomeruli in healthy and diseased human donor kidneys that were not accepted for transplant. Three human kidneys were obtained at autopsy through a donor network (The International Institute for the Advancement of Medicine, Edison, NJ) after receiving Institutional Review Board (IRB) approval and informed consent from Arizona State University, and they were imaged by CFE-MRI.

Figure 6:
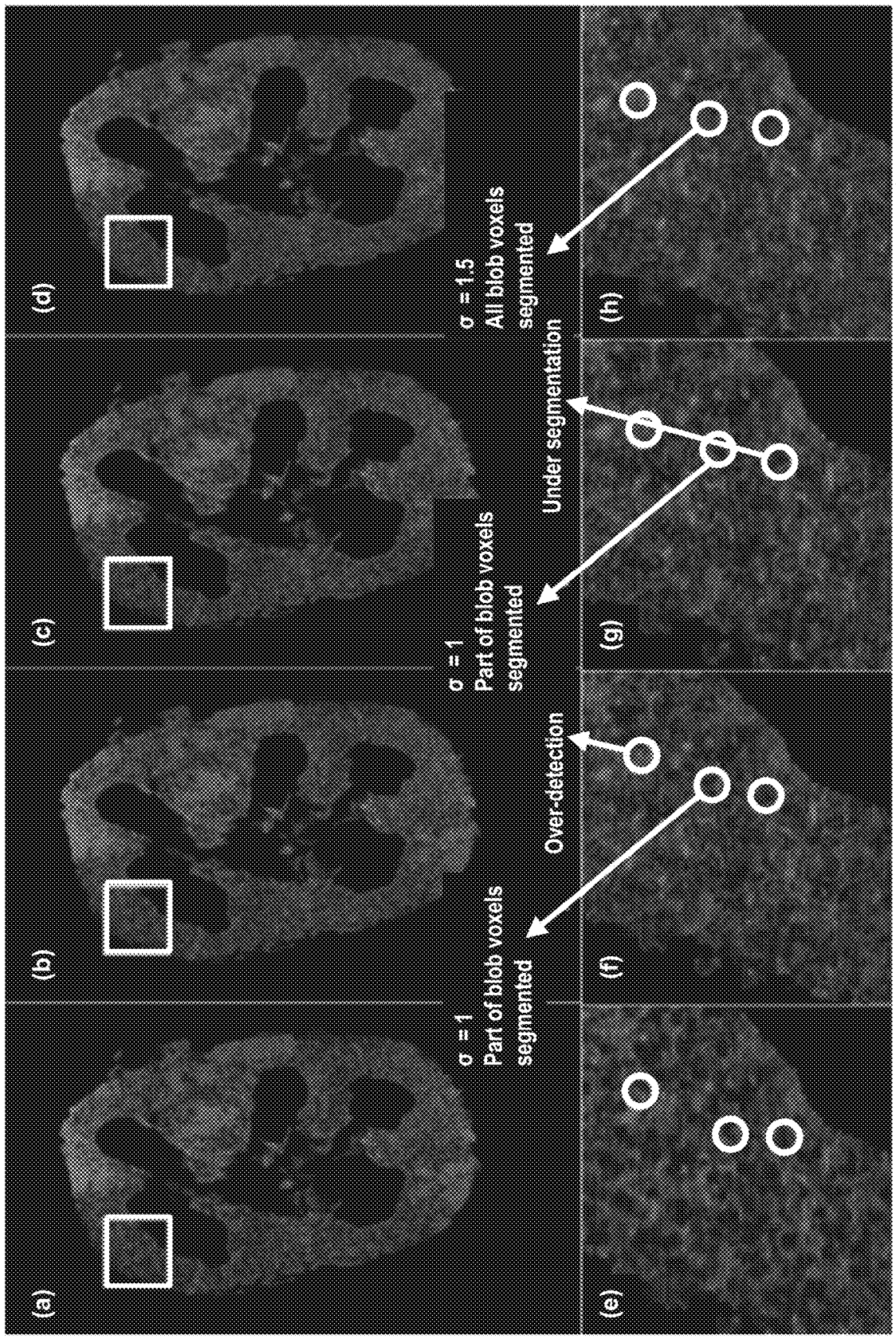
FIG. 6 illustrates a set of glomerular segmentation results from 3D MR images of a human kidney related to an experiment conducted in accordance with various exemplary embodiments.

Each human MR image had pixel dimensions of 896×512×512. HDoG, UH-DoG, and BTCAS blob detector were utilized to segment glomeruli. The parameter settings of DoG were as follows: window size $N=7$, $\gamma=2$, and $\Delta s=0.001$. First, 14,336 2D patches were generated with each patch being 128×128 in size, and each patch was then fed into U-Net. The threshold for the U-Net probability map in UH-DoG was 0.5. Quality control was performed by visually checking the identified glomeruli, visible as black spots in the images. For illustration, example results from CF2 which had more heterogenous pattern are shown in FIG. 6. FIG. 6 shows the glomerular segmentation results from 3D MR images of human kidney (CF2 slice 256); image (a) is the original magnitude image, image (b) shows glomerular segmentation results of HDoG, image (c) shows glomerular segmentation results of UH-DoG, image (d) shows glomerular segmentation results of BTCAS blob detector, and images (e)-(h) show magnified regions from images (a)-(d) indicated by boxes shown in images (a)-(d). As shown, the BTCAS blob detector performed better than HDoG and UH-DoG in segmentation. Several example glomeruli are marked with various circles in images (e)-(h). In images (e)-(h) of FIG. 6, the top circles show that some noise was detected as false positives by HDoG and UH-DoG. However, the BTCAS blob detector performed well using the denoising provided by U-Net. The bottom circles show some blobs that were under-segmented in UH-DoG due to the fixed probability threshold. The BTCAS blob detector was able to capture these. The middle circles show that for blobs with a range of sizes, the BTCAS blob detector delineated all voxels of blobs with the adaptive optimum DoG scale.

Nglom and aVglom are shown in Tables IV and V, where HDoG, UH-DoG, and BTCAS blob detector described herein were compared to data from unbiased dissector-fractionator stereology representing a ground truth in the average measurements in each kidney. The stereology data and the method of calculating aVglom known in the art were used. The differences between the results of HDoG, UH-DoG, BTCAS methods, and stereology data are also listed in Tables IV and V. Compared to stereology, HDoG identified more glomeruli, and the difference from stereology was much larger for HDoG than for the other two methods, indicating over-detection under the single optimal scale of DoG and lower mean aVglom than stereology. UH-DoG identified fewer glomeruli due to under-segmentation when using the single thresholding (0.5) on the probability map of U-Net combined with the Hessian convexity map. BTCAS provided the most accurate measurements of Nglom and mean aVglom when compared to the other two methods.

TABLE IV

HUMAN KIDNEY GLOMERULAR SEGMENTATION (NGLOM) FROM CFE-MRI USING HDoG, UH-DoG AND THE BTCAS BLOB DETECTORS COMPARED TO DISSECTOR-FRACTIONATOR STEREOLOGY

| Human Kidney | Nglom ($\times 10^6$) (Stereology) | Nglom ($\times 10^6$) (BTCAS) | Difference Ratio (%) | Nglom ($\times 10^6$) (UH-DoG) | Difference Ratio (%) | Nglom ($\times 10^6$) (HDoG) | Difference Ratio (%) |
|---|---|---|---|---|---|---|---|
| CF 1 | 1.13 | 1.16 | 2.65 | 0.66 | 41.60 | 2.95 | >100 |
| CF 2 | 0.74 | 0.86 | 16.22 | 0.48 | 35.14 | 1.21 | 63.51 |
| CF 3 | 1.46 | 1.50 | 2.74 | 0.85 | 41.78 | 3.93 | >100 |

TABLE V

HUMAN KIDNEY GLOMERULAR SEGMENTATION FROM CFE-MRI (MEAN AVGLOM) USING HDoG, UH-DoG AND THE BTCAS BLOB DETECTORS COMPARED TO DISSECTOR-FRACTIONATOR STEREOLOGY

| Human Kidney | Mean aVglom ($\times 10^{-3}$ mm$^3$) (Stereology) | Mean aVglom ($\times 10^{-3}$ mm$^3$) (BTCAS) | Difference Ratio (%) | Mean aVglom ($\times 10^{-3}$ mm$^3$) (UH-DoG) | Difference Ratio (%) | Mean aVglom ($\times 10^{-3}$ mm$^3$) (HDoG) | Difference Ratio (%) |
|---|---|---|---|---|---|---|---|
| CF 1 | 5.01 | 5.32 | 6.19 | 7.36 | 46.91 | 4.8 | 4.19 |
| CF 2 | 4.68 | 4.78 | 2.14 | 5.62 | 20.09 | 3.2 | 31.62 |
| CF 3 | 2.82 | 2.55 | 9.57 | 3.73 | 32.37 | 3.2 | 13.48 |

Experiment III: Validation Using 3D Mouse Kidney CFE-MR Images

Moreover, experiments were conducted on CF-labeled glomeruli from a dataset of 3D MR images to measure Nglom and aVglom of glomeruli in healthy and diseased mouse kidneys. This dataset included chronic kidney disease (CKD, n=3) vs. controls (n=6) and acute kidney injury (AKI, n=4) vs. control (n=5). The animal experiments were approved by the Institutional Animal Care and Use Committee (IACUC) under protocol #3929 on Apr. 7, 2020 at the University of Virginia, in accordance with the National Institutes of Health Guide for the Care and Use of Laboratory Animals. They were imaged by CFE-MRI.

Each MII image had pixel dimensions of 256×256×256. HDoG, HDoG with VBGMM (Variational Bayesian Gaussian Mixture Model), UH-DoG, and BTCAS blob detector were utilized to segment glomeruli. The parameter settings of DoG were: window size N=7, γ=2, and Δs=0.001. To denoise the 3D blob images by using trained U-Net, each slice was first resized to 512×512, and then each slice was fed into U-Net. The threshold for the U-Net probability map in UH-DoG was 0.5.

Nglom and mean aVglom are shown in Table VI and Table VII, where HDoG, UH-DoG, and BTCAS blob detector described herein are compared to HDoG with VBGMM. The differences between the results are also listed in Tables VI and VII. Compared to HDoG with VBGMM, HDoG identified more glomeruli, and the difference from HDoG with VBGMM for HDoG was much larger than for the other two methods, indicating over-detection under the single optimal scale of the DoG and lower mean aVglom than HDoG with VBGMM. UH-DoG identified fewer glomeruli and larger mean aVglom due to under-segmentation when using the single thresholding (0.5) on the probability map of U-Net combined with the Hessian convexity map. BTCAS provided the most accurate measurements of Nglom and mean aVglom compared to the other two methods.

TABLE VI

MOUSE KIDNEY GLOMERULAR SEGMENTATION (Nglom) FROM CFE-MRI USING HDoG, UH-DoG AND THE BTCAS COMPARED TO HDoG WITH VBGMM METHOD

| Mouse kidney | | $N_{glom}$ (HDoG with VBGMM) | $N_{glom}$ (BTCAS) | Difference Ratio (%) | $N_{glom}$ (UH-DoG) | Difference Ratio (%) | $N_{glom}$ (HDoG) | Difference Ratio (%) |
|---|---|---|---|---|---|---|---|---|
| CKD | ID 429 | 7,656 | 7,719 | 0.82 | 7,346 | 4.05 | 10,923 | 42.67 |
| | ID 466 | 8,665 | 8,228 | 5.04 | 8,138 | 6.08 | 9,512 | 9.77 |
| | ID 467 | 8,549 | 8,595 | 0.54 | 8,663 | 1.33 | 12,755 | 49.20 |
| | Avg | 8,290 | 8,181 | 2.13 | 8,049 | 2.91 | 11,063 | 33.88 |
| | Std | 552 | 440 | | 663 | | 1626 | |

TABLE VI-continued

MOUSE KIDNEY GLOMERULAR SEGMENTATION (Nglom) FROM CFE-MRI USING HDoG, UH-DoG AND THE BTCAS COMPARED TO HDoG WITH VBGMM METHOD

| Mouse kidney | | $N_{glom}$ (HDoG with VBGMM) | $N_{glom}$ (BTCAS) | Difference Ratio (%) | $N_{glom}$ (UH-DoG) | Difference Ratio (%) | $N_{glom}$ (HDoG) | Difference Ratio (%) |
|---|---|---|---|---|---|---|---|---|
| Control for CKD | ID 427 | 12,724 | 12,008 | 5.63 | 12,701 | 0.18 | 15,515 | 21.93 |
| | ID 469 | 10,829 | 11,048 | 2.02 | 11,347 | 4.78 | 15,698 | 44.96 |
| | ID 470 | 10,704 | 10,969 | 2.48 | 11,309 | 5.65 | 13,559 | 26.67 |
| | ID 471 | 11,943 | 12,058 | 0.96 | 12,279 | 2.81 | 16,230 | 35.90 |
| | ID 472 | 12,569 | 13,418 | 6.75 | 12,526 | 0.34 | 17,174 | 36.64 |
| | ID 473 | 12,245 | 12,318 | 0.60 | 11,853 | 3.20 | 15,350 | 25.36 |
| | Avg | 11,836 | 11,970 | 3.07 | 12,003 | 1.41 | 15,588 | 31.91 |
| | Std | 872 | 903 | | 595 | | 1193 | |
| AKI | ID 433 | 11,046 | 10,752 | 2.66 | 11,033 | 0.12 | 12,315 | 11.49 |
| | ID 462 | 11,292 | 10,646 | 5.72 | 10,779 | 4.54 | 17,634 | 56.16 |
| | ID 463 | 11,542 | 11,820 | 2.41 | 10,873 | 5.80 | 20,458 | 77.25 |
| | ID 464 | 11,906 | 12,422 | 4.33 | 11,340 | 4.75 | 25,233 | >100 |
| | Avg | 11,447 | 11,410 | 3.78 | 11,006 | 3.85 | 18,910 | 64.21 |
| | Std | 367 | 858 | | 246 | | 5401 | |
| Control for AKI | ID 465 | 10,336 | 10,393 | 0.55 | 10,115 | 2.14 | 13,473 | 30.35 |
| | ID 474 | 10,874 | 11,034 | 1.47 | 11,157 | 2.60 | 16,934 | 55.73 |
| | ID 475 | 10,292 | 9,985 | 2.98 | 10,132 | 1.55 | 12,095 | 17.52 |
| | ID 476 | 10,954 | 11,567 | 5.60 | 10,892 | 0.57 | 15,846 | 44.66 |
| | ID 477 | 10,885 | 11,143 | 2.37 | 11,335 | 4.13 | 14,455 | 32.80 |
| | Avg | 10,668 | 10,824 | 2.59 | 10,726 | 0.54 | 14,561 | 36.21 |
| | Std | 325 | 630 | | 572 | | 1908 | |

TABLE VII

MOUSE KIDNEY GLOMERULAR SEGMENTATION (MEAN aVglom) FROM CFE-MRI USING HDoG, UH-DoG AND THE BTCAS COMPARED TO HDoG WITH VBGMM METHOD

| Mouse kidney | | Mean $aV_{glom}$ (HDoG with VBGMM) | Mean $aV_{glom}$ (BTCAS) | Difference Ratio (%) | Mean $aV_{glom}$ (UH-DoG) | Difference Ratio (%) | Mean $aV_{glom}$ (HDoG) | Difference Ratio (%) |
|---|---|---|---|---|---|---|---|---|
| CKD | ID 429 | 2.57 | 2.63 | 2.33 | 2.92 | 11.99 | 2.46 | 4.28 |
| | ID 466 | 2.01 | 2.01 | 0.00 | 2.06 | 2.43 | 1.75 | 12.94 |
| | ID 467 | 2.16 | 2.20 | 1.85 | 2.32 | 6.90 | 1.9 | 12.04 |
| | Avg | 2.25 | 2.28 | 1.40 | 2.43 | 7.67 | 2.04 | 9.75 |
| | Std | 0.29 | 0.32 | | 0.44 | | 0.37 | |
| Control for CKD | ID 427 | 1.49 | 1.57 | 5.37 | 1.61 | 7.45 | 1.49 | 0.00 |
| | ID 469 | 1.91 | 1.95 | 2.09 | 2.20 | 13.18 | 1.76 | 7.85 |
| | ID 470 | 1.98 | 2.05 | 3.54 | 2.04 | 2.94 | 1.73 | 12.63 |
| | ID 471 | 1.5 | 1.58 | 5.33 | 1.56 | 3.85 | 1.4 | 6.67 |
| | ID 472 | 1.35 | 1.36 | 0.74 | 1.49 | 9.40 | 1.35 | 0.00 |

TABLE VII-continued

MOUSE KIDNEY GLOMERULAR SEGMENTATION (MEAN aVglom) FROM CFE-MRI USING HDoG, UH-DoG AND THE BTCAS COMPARED TO HDoG WITH VBGMM METHOD

| Mouse kidney | | Mean $aV_{glom}$ (HDoG with VBGMM) | Mean $aV_{glom}$ (BTCAS) | Difference Ratio (%) | Mean $aV_{glom}$ (UH-DoG) | Difference Ratio (%) | Mean $aV_{glom}$ (HDoG) | Difference Ratio (%) |
|---|---|---|---|---|---|---|---|---|
| | ID 473 | 1.5 | 1.56 | 4.00 | 1.58 | 5.06 | 1.39 | 7.33 |
| | Avg | 1.62 | 1.68 | 3.51 | 1.75 | 7.16 | 1.52 | 5.75 |
| | Std | 0.26 | 0.26 | | 0.30 | | 0.18 | |
| AKI | ID 433 | 1.53 | 1.64 | 7.19 | 1.63 | 6.13 | 1.38 | 9.80 |
| | ID 462 | 1.34 | 1.41 | 5.22 | 1.48 | 9.46 | 1.3 | 2.99 |
| | ID 463 | 2.35 | 2.4 | 2.13 | 2.61 | 9.96 | 1.94 | 17.45 |
| | ID 464 | 2.31 | 2.36 | 2.16 | 2.40 | 3.75 | 1.78 | 22.94 |
| | Avg | 1.88 | 1.95 | 4.18 | 2.03 | 7.27 | 1.60 | 13.29 |
| | Std | 0.52 | 0.50 | | 0.56 | | 0.31 | |
| Control for AKI | ID 465 | 2.3 | 2.46 | 6.96 | 2.40 | 4.17 | 2.11 | 8.26 |
| | ID 474 | 2.44 | 2.34 | 4.10 | 2.52 | 3.17 | 2.14 | 12.30 |
| | ID 475 | 1.74 | 1.86 | 6.90 | 1.70 | 2.35 | 1.58 | 9.20 |
| | ID 476 | 1.53 | 1.57 | 2.61 | 1.62 | 5.56 | 1.49 | 2.61 |
| | ID 477 | 1.67 | 1.68 | 0.60 | 1.70 | 1.76 | 1.61 | 3.59 |
| | Avg | 1.94 | 1.98 | 4.23 | 1.99 | 2.62 | 1.79 | 7.19 |
| | Std | 0.41 | 0.40 | | 0.43 | | 0.31 | |

Discussion of Computation Time

Various embodiments of the systems and methods described herein use U-Net for pre-processing, followed by DoG where the scales vary depending on sizes of blobs (e.g., glomeruli). The computational time of U-Net was satisfactory. For example, it took less than 5 minutes for training and less than 1 second per slice or per patch for testing.

With respect to the computation efforts related to the DoG implementation, given a 3D image in $N_1 \times N_2 \times N_3$ and a convolutional filtering kernel size as $r_1 \times r_2 \times r_3$, the computational complexity of HDoG is $O(N_1 N_2 N_3 (r_1+r_2+r_3))$. Considering the BTCAS method described herein, with $N_S$ being the number of scales searched ($N_S > 1$), the computational complexity is $O(N_s N_1 N_2 N_3 (r_1+r_2+r_3))$. Thus, BTCAS may involve more computing effort compared to HDoG since $N_s > 1$—however, for HDoG, the single scale approach suffers from performances as shown in the comparison experiments (see FIG. 6 and Tables II-VII discussed herein). Exhaustively searching optimum scale for each glomerulus however may be computational prohibitive. Table VIII summarizes the computational time for DoG under exhaustive search on scales (noting the scale ranges [0, 1.5] using stereology knowledge) for each glomerulus and that for BTCAS. As shown, BTCAS saves about 30% computing time.

TABLE VIII

COMPARISON OF COMPUTATION TIME BETWEEN DOG UNDER GLOMERULUS-SPECIFIC OPTIMAL SCALE AND BTCAS METHOD

| Human Kidney | DOG under glomerulus-specific optimal scale (second) | BTCAS (second) | Difference Ratio (%) |
|---|---|---|---|
| CF 1 | 51,238 | 34,792 | 32.10 |
| CF 2 | 39,616 | 28,156 | 28.93 |
| CF 3 | 59,703 | 41,425 | 30.61 |
| AVG ± STD | 50,186 ± 10,085 | 34,791 ± 6,635 | 30.55 ± 1.59 |

Discussion of Proposition 1 and Proposition 2

Proposition 1 and Proposition 2 referenced herein are described with more detail below.

Proposition 1

For any blob, with the normalized intensity distribution of the blob being $I_b(x,y,z) \in [0,1]^{I_1 \times I_2 \times I_3}$ and the centroid of the blob being $(\mu_x, \mu_y, \mu_z)$ and an assumption that the blob (after denoising) follows a rotationally symmetric Gaussian distribution, $$I_b(x, y, z) = \frac{1}{2\pi\sigma^2} \exp\left(-\frac{(x-\mu_x)^2 + (y-\mu_y)^2 + (z-\mu_z)^2}{2\sigma^2}\right). \quad (25)$$

The probability predicted by U-Net increases or decreases monotonically from the centroid to the boundary of the dark or bright blob.

As a way of a proof, following is provided. With respect to bright blobs, with the input intensity distributions of a blob with noise being $I_N \in [0,1]^{I_1 \times I_2 \times I_3}$, $$I_N = I_b + \varepsilon, \varepsilon \sim \mathcal{N}(0, \sigma^2 I). \tag{26}$$

Then, the probability map from U-Net may be defined as $U(x, y, z) \in [0,1]^{I_1 \times I_2 \times I_3}$ which indicates the probability of each voxel belonging to any blob. The probability of blob $U_b$ can approximate the intensity distribution of the blob based on (4):

$$U_b(x,y,z) = \mathcal{F}_b(I_N;\Theta) = \mathcal{F}_b(I_b+\varepsilon;\Theta) \approx I_b(x,y,z). \tag{27}$$

The probabilities from $U_b(x, y, z)$ thus follow a Gaussian distribution and the probabilities monotonically decrease from the centroid to the boundary of a blob, with $U_b(\mu_x, \mu_y, \mu_z)$ reaching maximum probability.

Proposition 2

Given a binarized probability map, a blob may be identified with a radius r. With $B_L(x, y, z)$ and $B_H(x, y, z)$, $r_{\delta_L}$ and $r_{\delta_H}$ may be obtained respectively. $B_L(x, y, z)$ marks a larger blob region extending to the boundaries with low probability, and $B_H(x, y, z)$ marks a smaller blob region extending the boundary with high probability, that is $r_{\delta_L} > r_{\delta_H}$.

As a way of a proof, following is provided. From (25) and (27), the following may be obtained:

$$U_b(x, y, z) \approx I_b(x, y, z) = \frac{1}{2\pi\sigma^2} \exp\left(-\frac{(x-\mu_x)^2 + (y-\mu_y)^2 + (z-\mu_z)^2}{2\sigma^2}\right). \tag{28}$$

With the radius of a blob being $r(\delta) \in R$, the distance between the thresholding pixel $(x_\delta, y_\delta, z_\delta)$ and the centroid of blob may be approximated by the radius of the blob:

$$r(\delta) \approx \sqrt{(x_\delta-\mu_x)^2 + (y_\delta-\mu_y)^2 + (z_\delta-\mu_z)^2}. \tag{29}$$

Given high probability threshold $\delta_H$ and low probability threshold $\delta_L$, $$U_b(x_{\delta_H}, y_{\delta_H}, z_{\delta_H}) = \delta_H, \tag{30}$$

and $$U_b(x_{\delta_L}, y_{\delta_L}, z_{\delta_L}) = \delta_L. \tag{31}$$

From Proposition 1, the blob centroid has the maximum probability, and the probability monotonically decreases from the centroid to the boundary:

$$U_b(x_{\delta_L}, y_{\delta_L}, z_{\delta_L}) < U_b(x_{\delta_H}, y_{\delta_H}, z_{\delta_H}) < U_b(\mu_x, \mu_y, \mu_z), \tag{32}$$

and $$r(\delta_L) > r(\delta_H) > r(U_b(\mu_x, \mu_y, \mu_z)) = 0. \tag{33}$$

Description of Methods

The exemplary BTCAS systems and methods described herein provide an adaptive and effective tuning-free detector for blob detection and segmentation, which may be utilized for kidney biomarker identification for clinical use.

Figure 7:
FIG. 7 is a process performed by a blob detection system using deep learning in accordance with various exemplary embodiments.
Figure 7:
Figure 7:

Principles of the present disclosure contemplate novel systems and methods for blob detection using deep learning techniques. In various embodiments and with reference to FIG. 7, a BTCAS blob detector includes two steps to detect blobs (for example, kidney glomeruli) from CFE-MRI. Step one may include training a U-Net to generate a probability map to detect the centroids of the blobs (step 702), and then deriving two distance maps with bounded probabilities (step 704). Step two may include applying a DoG filter with an adaptive scale constrained by the bounded distance maps (step 706), followed by Hessian analysis for final blob segmentation (step 708).

In various exemplary embodiments, exemplary systems and methods offer various advantages and improvements over prior approaches. For example, an exemplary system including a U-Net reduces over-detection when used in an initial denoising step. This results in a probability map with the identified centroid of blob candidates. Moreover, in exemplary systems, distance maps may be rendered with lower and upper probability bounds, which may be used as the constraints for local scale search for DoG. Additionally, in some exemplary embodiments, a local optimum DoG scale may be adapted to the range of blob sizes to better separate touching blobs. In two experiments described herein, the advantages of exemplary embodiments were confirmed: an adaptive scale based on deep learning greatly decreased under-segmentation by U-Net with over 80% increase in Dice and IoU and decreased over-detection by DoG with over 100% decrease in error rate of blob detection.

Moreover, in some embodiments, the DoG and the Hessian analysis may be integrated as layers of an overall deep learning network for comprehensive blob (e.g., glomerular) segmentation. In some embodiments, a 3D U-Net may be utilized instead of a 2D U-Net. Furthermore, in some embodiments related to glomeruli detection, a semi-supervised learning may be utilized by, e.g., incorporating domain knowledge of glomeruli to further improve glomerular detection and segmentation. The BTCAS systems and methods described herein were shown to be an adaptive and effective tuning-free detector for blob detection and segmentation and may be utilized for, e.g., kidney biomarker identification for clinical use.

In some exemplary embodiments, a blob detection system may include software operating on a general-purpose processor. In other exemplary embodiments, a blob detection system may include an application-specific integrated circuit (ASIC). In still other exemplary embodiments, a blob detection system may include instructions operative on a reconfigurable computing device, for example a field-programmable gate array (FPGA). Moreover, a blob detection system and methods thereof may be implemented as distributed software operative on multiple processors.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of any embodiment. In the claims, reference to an element in the singular is not intended to mean "one and only one" unless explicitly so stated, but rather "one or more."

Systems, methods, and apparatus are provided herein. In the detailed description herein, references to "various exemplary embodiments", "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

What is claimed is:

1. A system for blob detection using deep learning, the system comprising:
   a non-transitory computer-readable storage medium configured to store a plurality of instructions thereon which, when executed by a processor, cause the system to:
   train a U-Net and generate a probability map including a plurality of centroids of a plurality of corresponding blobs;
   derive, from the U-Net, two distance maps with bounded probabilities, wherein the two distance maps are derived from the probability map;
   apply Difference of Gaussian (DoG) with an adaptive scale constrained by the two distance maps with the bounded probabilities; and
   apply Hessian analysis and perform a blob segmentation.

2. The system of claim 1, wherein the system includes a multi-threshold, multi-scale small blob detector.

3. The system of claim 1, wherein the two distance maps include binarized maps of distances between the plurality of centroids of the plurality of corresponding blobs utilized to bound a search space for scales of the DoG.

4. The system of claim 3, wherein the plurality of instructions are further configured to cause the system to generate a Hessian convexity map using the adaptive scale.

5. The system of claim 4, wherein the plurality of instructions are further configured to cause the system to eliminate an under-segmentation of the U-Net.

6. The system of claim 1, wherein the system includes a Bi-Threshold Constrained Adaptive Scale (BTCAS) blob detector configured to perform the plurality of instructions.

7. The system of claim 1, wherein the plurality of instructions include an implementation of a modified fully convolutional network including one or more concatenation paths.

8. The system of claim 1, wherein the two distance maps are derived from the probability map by binarizing the probability map using low and high probability thresholds to generate a binarized probability map.

9. The system of claim 8, wherein the binarized probability map includes a set of blob voxels and a set of boundary voxels, and the two distance maps are derived from the binarized probability map based on a Euclidean distance between each voxel of the set of blob voxels and a nearest boundary voxel of the set of boundary voxels.

10. The system of claim 1, wherein the U-Net is trained without a ground truth.

11. An apparatus for blob detection using deep learning, the apparatus comprising:
   a non-transitory computer-readable storage medium configured to store a plurality of instructions thereon which, when executed by a processor, cause the apparatus to:
   train a U-Net and generate a probability map including a plurality of centroids of a plurality of corresponding blobs;

derive, from the U-Net, two distance maps with bounded probabilities, wherein the two distance maps are derived from the probability map;

apply Difference of Gaussian (DoG) with an adaptive scale constrained by the two distance maps with the bounded probabilities; and apply Hessian analysis and perform a blob segmentation.

12. The apparatus of claim 11, further comprising a multi-threshold, multi-scale small blob detector.

13. The apparatus of claim 11, wherein the two distance maps include binarized maps of distances between the plurality of centroids of the plurality of corresponding blobs utilized to bound a search space for scales of the DoG.

14. The apparatus of claim 13, wherein the plurality of instructions are further configured to cause the apparatus to generate a Hessian convexity map using the adaptive scale.

15. The apparatus of claim 14, wherein the plurality of instructions are further configured to cause the apparatus to eliminate an under-segmentation of the U-Net.

16. The apparatus of claim 11, wherein the apparatus includes a Bi-Threshold Constrained Adaptive Scale (BT-CAS) blob detector configured to perform the plurality of instructions.

17. The apparatus of claim 11, wherein the plurality of instructions include an implementation of a modified fully convolutional network including one or more concatenation paths.

18. The apparatus of claim 11, wherein the two distance maps are derived from the probability map by binarizing the probability map using low and high probability thresholds to generate a binarized probability map.

19. The apparatus of claim 18, wherein the binarized probability map includes a set of blob voxels and a set of boundary voxels, and the two distance maps are derived from the binarized probability map based on a Euclidean distance between each voxel of the set of blob voxels and a nearest boundary voxel of the set of boundary voxels.

\* \* \* \* \*